(12) United States Patent
Kamigaki et al.

(10) Patent No.: US 11,480,856 B2
(45) Date of Patent: Oct. 25, 2022

(54) PROJECTION LENS

(71) Applicant: FUJIFILM Corporation, Tokyo (JP)

(72) Inventors: Tetsuo Kamigaki, Saitama (JP);
Hitoshi Shimizu, Saitama (JP); Yasuto Kuroda, Saitama (JP); Hironobu Kayano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/244,459

(22) Filed: Apr. 29, 2021

(65) Prior Publication Data
US 2021/0255529 A1    Aug. 19, 2021

Related U.S. Application Data

(63) Continuation of application No. PCT/JP2019/043264, filed on Nov. 5, 2019.

(30) Foreign Application Priority Data

Nov. 2, 2018    (JP) ................................ 2018-207734

(51) Int. Cl.
*G03B 21/14*      (2006.01)
*G03B 21/28*      (2006.01)

(52) U.S. Cl.
CPC ........... *G03B 21/142* (2013.01); *G03B 21/28* (2013.01)

(58) Field of Classification Search
CPC ...... G03B 21/00; G03B 21/14; G03B 21/142; G03B 21/28

(Continued)

(56) References Cited

U.S. PATENT DOCUMENTS 7,619,828 B2* 11/2009 Nogami ............... G02B 27/025
                                                                                                                         359/733
7,830,625 B2* 11/2010 Iba ......................... G02B 7/023
                                                                                                                           359/811

(Continued)

FOREIGN PATENT DOCUMENTS

JP      2008-203540 A      9/2008
JP      2008-276152 A     11/2008

(Continued)

OTHER PUBLICATIONS

International Preliminary Report on Patentability and Written Opinion of the International Searching Authority (Forms PCT/IB/326, PCT/IB/373 and PCT/ISA/237) for corresponding International Application No. PCT/JP2019/043264, dated May 14, 2021, with English translation.

(Continued)

*Primary Examiner* — William C. Dowling
(74) *Attorney, Agent, or Firm* — Birch, Stewart, Kolasch & Birch, LLP

(57) ABSTRACT

There is provided a projection lens that is mounted on a housing of a projection device including an electro-optical element. The projection lens includes a first holding frame through which light emitted from the housing passes, a second reflective part that refracts an optical axis of light emitted from the first holding frame and includes a pair of side surfaces facing each other, and a second holding frame that holds the second reflective part and includes a pair of first holes provided at positions corresponding to the pair of side surfaces; and each of the pair of side surfaces has a gap between itself and the second holding frame.

19 Claims, 17 Drawing Sheets

(58) Field of Classification Search
USPC .......................................... 353/98, 100, 101
See application file for complete search history.

(56) References Cited

U.S. PATENT DOCUMENTS

| | | | |
|---|---|---|---|
| 10,168,609 B2 * | 1/2019 | Kuroda | ................ G02B 13/16 |
| 2008/0291552 A1 | 11/2008 | Nogami | |
| 2009/0027783 A1 | 1/2009 | Iba et al. | |
| 2018/0217489 A1 | 8/2018 | Kurada | |
| 2019/0088783 A1 | 3/2019 | Kuroda | |
| 2019/0101816 A1 | 4/2019 | Kuroda | |
| 2019/0219915 A1 | 7/2019 | Kayano | |

FOREIGN PATENT DOCUMENTS

| | | |
|---|---|---|
| JP | 2008-281640 A | 11/2008 |
| JP | 2018-72590 A | 5/2018 |
| WO | WO 2017/056925 A1 | 4/2017 |
| WO | WO 2018/055964 A1 | 3/2018 |

OTHER PUBLICATIONS

International Search Report (Form PCT/ISA/210) for corresponding International Application No. PCT/JP2019/043264, dated Jan. 28. 2020, with English translation.
Japanese Notice of Reasons for Refusal for Japanese Application No. 2018-207734, dated Aug. 27, 2019, with English translation.
Japanese Notice of Reasons for Refusal for Japanese Application No. 2018-207734, dated Jan. 21, 2020, with English translation.

* cited by examiner

PROJECTION LENS

CROSS-REFERENCE TO RELATED APPLICATIONS

This application is a continuation application of International Application No. PCT/JP2019/043264, filed on Nov. 5, 2019, which is incorporated herein by reference in its entirety. Further, this application claims priority from Japanese Patent Application No. 2018-207734, filed on Nov. 2, 2018, the disclosure of which is incorporated by reference herein in its entirety.

BACKGROUND

Technical Field

The technique of the present disclosure relates to a projection lens.

Related Art

A projector as a projection device for projecting an image on a screen has been widely distributed. A projector comprises, for example, an image forming panel, such as a liquid crystal display (LCD) or a digital micromirror device (DMD: registered trademark), and a projection lens that projects the image formed by the image forming panel on a screen.

A projector comprising a projection lens, which can change the projection direction of an image, has been developed as such a projector (see WO2018/055964A and WO2017/056925A). In the projector disclosed in WO2017/056925A, an image forming panel is housed in a body part and a projection lens is mounted on the outer peripheral surface of the body part.

In the projector disclosed in WO2017/056925A, luminous flux representing the image formed by an image forming panel is incident on the projection lens from the body part. The projection lens comprises a bending optical system having three optical axes, that is, a first optical axis, a second optical axis, and a third optical axis in this order from an incident side. The first optical axis is an optical axis corresponding to luminous flux incident from the body part. The second optical axis is bent at an angle of 90° from the first optical axis by a second reflective part. The third optical axis is an emission optical axis which is bent at an angle of 90° from the second optical axis by a first reflective part and along which luminous flux is emitted to a screen.

The projection lens includes an incident-side end part, an intermediate part, and an emission-side end part that correspond to the first optical axis, the second optical axis, and the third optical axis, respectively. The incident-side end part is non-rotatably mounted on the body part, and the intermediate part is rotated about the first optical axis with respect to the incident-side end part. In a case where the intermediate part is rotated, the emission-side end part connected to the intermediate part is also rotated about the first optical axis. Further, the emission-side end part is rotated about the second optical axis with respect to the intermediate part. Since the emission-side end part is rotated about the first optical axis and the second optical axis as described above, the projection direction is changed.

In the projection lens of the projector disclosed in WO2017/056925A, a second holding unit holding an optical system forming the second optical axis is movable in a plane orthogonal to the second optical axis with respect to a first holding unit holding an optical system forming the first optical axis.

Here, it is difficult to precisely adjust the optical axis bent by a reflective part in, for example, a projection lens of which the attitude of the reflective part cannot be adjusted, or the like.

SUMMARY

An object of a technique of the disclosure is to provide a projection lens in which an optical axis bent by a reflective part can be precisely adjusted.

A projection lens according to a first aspect is mounted on a housing of a projection device including an electro-optical element, and comprises a first holding frame through which light emitted from the housing passes, a first reflective part that reflects an optical axis of light emitted from the first holding frame and includes a pair of side surfaces facing each other, and a second holding frame that holds the first reflective part and includes a pair of first holes provided at positions corresponding to the pair of side surfaces. Each of the pair of side surfaces has a gap between each side surface and the second holding frame.

In a projection lens according to a second aspect, the second holding frame is rotatable with respect to the first holding frame.

A projection lens according to a third aspect further comprises a first cover member that covers the pair of first holes.

In a projection lens according to a fourth aspect, the first reflective part includes a surface reflecting light emitted from the first holding frame and a back and the back of the first reflective part does not adhere to the second holding frame.

In a projection lens according to a fifth aspect, the second holding frame includes second holes facing the side surfaces of the first reflective part and the side surfaces of the first reflective part adhere to the second holding frame through an adhesive.

In a projection lens according to a sixth aspect, the adhesive is an active energy ray-curable resin.

A projection lens according to a seventh aspect further comprises a second cover member that covers the second holes.

A projection lens according to an eighth aspect further comprises a second reflective part that reflects light, which is emitted from the housing and is parallel to a first optical axis, to form light parallel to a second optical axis, and a third holding frame that holds the second reflective part and includes no hole at positions facing side surfaces of the second reflective part; and the first reflective part reflects the light, which is parallel to the second optical axis, to form light parallel to a third optical axis.

In a projection lens according to a ninth aspect, a gap is provided between each of all the side surfaces of the first reflective part and the second holding frame.

A projection lens according to a tenth aspect is mounted on a housing of a projection device including an electro-optical element, and comprises a first holding frame through which light emitted from the housing and parallel to a second optical axis passes and which holds an intermediate optical system, a reflective part that includes a pair of side surfaces facing each other and reflects the light parallel to the second optical axis to form light parallel to a third optical axis, a second holding frame that holds the reflective part, and a fourth holding frame that holds an emission optical system emitting the light parallel to the third optical axis. The fourth holding frame is movable in a plane crossing a traveling direction of the light parallel to the third optical axis, and (A) or (B) is satisfied.

(A) The second holding frame includes a pair of first holes provided at positions corresponding to the pair of side surfaces of the reflective part.

(B) The first holding frame is movable in a plane crossing a traveling direction of the light parallel to the second optical axis.

A projection lens according to an eleventh aspect further comprises a fifth holding frame through which the second optical axis passes. The first holding frame is present in the fifth holding frame, and the first holding frame is movable in the fifth holding frame in a plane crossing the traveling direction of the light parallel to the second optical axis.

A projection lens according to a twelfth aspect further comprises a second holding unit that includes the fifth holding frame. The first holding frame, the second holding frame, and the fourth holding frame are connected to each other to form a third holding unit, and the third holding unit is rotatable with respect to the second holding unit.

A projection lens according to a thirteenth aspect further comprises a first holding unit through which light parallel to a first optical axis, which forms light parallel to the second optical axis by being reflected, passes. The second holding unit is rotatable with respect to the first holding unit.

In this specification, the terms "first", "second", "third", "fourth", and "fifth" are symbols used to distinguish the components having the same name and do not specify the number of certain members present in the projection device or the projection lens. Accordingly, the terms "first", "second", "third", "fourth", and "fifth" do not have meanings in interpreting the respective components.

According to the technique of the disclosure, an optical axis bent by the reflective part can be precisely adjusted.

DETAILED DESCRIPTION

An example of an embodiment of a technique of the disclosure will be described below with reference to the drawings.

Figure 1:
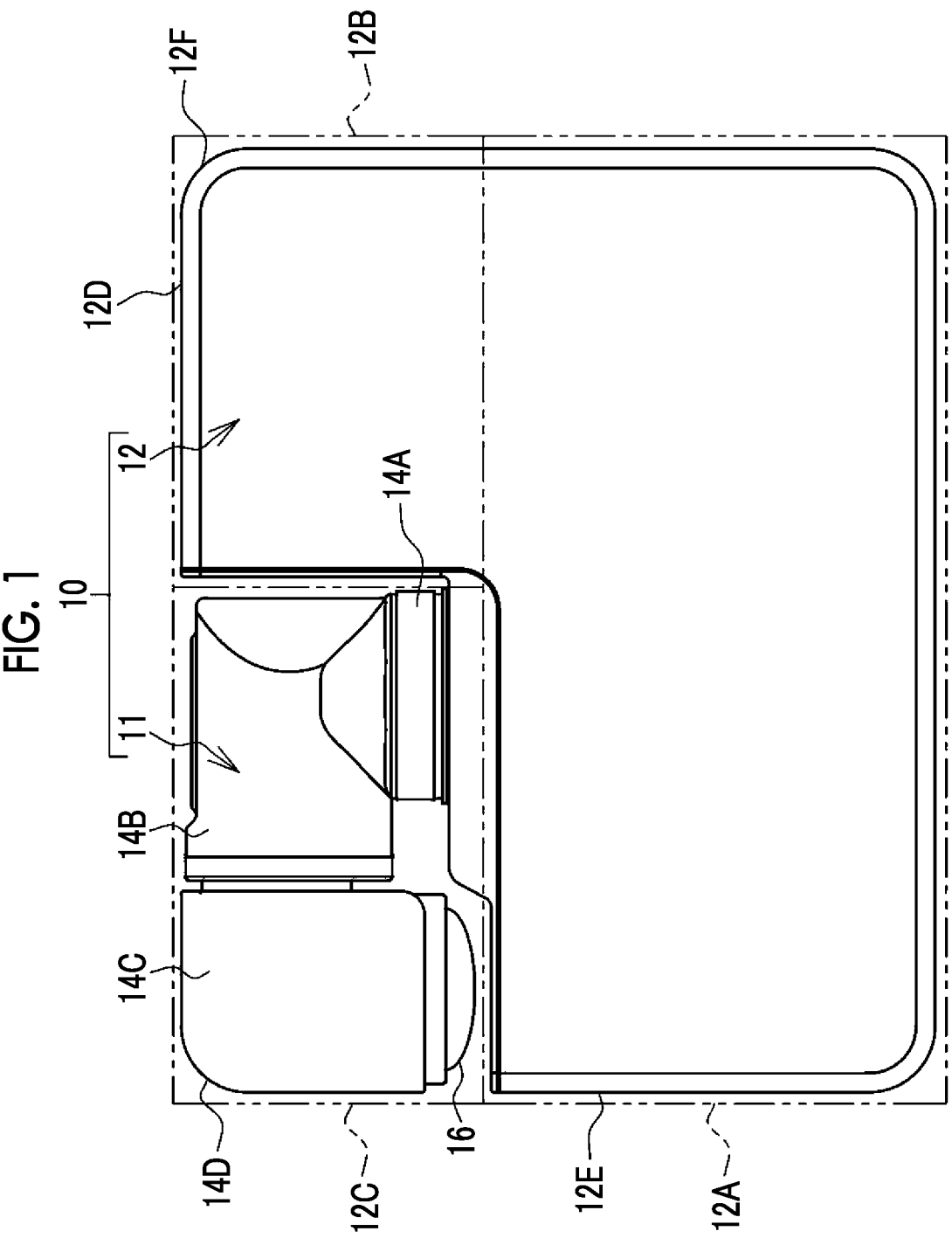
FIG. 1 is a plan view of a projector.

As shown in FIG. 1, a projector 10 of this embodiment corresponds to a projection device and comprises a projection lens 11 and a body part 12. The body part 12 corresponds to a housing. One end portion of the projection lens 11 is mounted on the body part 12. FIG. 1 shows a storage state where the projection lens 11 is stored in a case where the projector 10 is not in use.

The body part 12 comprises a base portion 12A, a protruding portion 12B, and a storage portion 12C. The base portion 12A houses main components, such as an image forming unit 26 (see FIG. 4) and a control board (not shown). The base portion 12A corresponds to a central portion. The base portion 12A has a substantially rectangular shape that is horizontally long in a plan view shown in FIG. 1. The protruding portion 12B protrudes from one side of the base portion 12A. The protruding portion 12B has a substantially rectangular shape, and the width of the protruding portion 12B is about a half of the length of one side of the base portion 12A. For this reason, the body part 12 has a substantially L-shape in a plan view as a whole including the base portion 12A and the protruding portion 12B.

The storage portion 12C stores the projection lens 11. In FIG. 1, the storage portion 12C is a space formed on the left side of the protruding portion 12B and has a substantially rectangular shape in a plan view like the protruding portion 12B. That is, it is assumed that a side surface 12D provided on the upper side and a side surface 12E provided on the left side in FIG. 1 among the outer peripheral surfaces of the body part 12 extend in directions where the side surface 12D and the side surface 12E cross each other. A space, which is defined using the respective extending side surfaces 12D and 12E as outer edges, is the storage portion 12C. For this reason, the body part 12 has a substantially L-shape by itself, but has a substantially rectangular shape in a plan view as a whole including the storage portion 12C. Since the storage portion 12C can also be regarded as a portion depressed toward the base portion 12A from the height of the protruding portion 12B in a case where the projector 10 is vertically placed, the storage portion 12C corresponds to a depressed portion.

In a case where the projector 10 is not in use, the projection lens 11 is stored in the storage portion 12C after being transformed not to protrude from the rectangular storage portion 12C. For this reason, since the projector 10 has a substantially rectangular parallelepiped shape as a whole in which the L-shaped body part 12 and the projection lens 11 are combined with each other, the unevenness of the outer peripheral surfaces is reduced in the storage state as shown in FIG. 1. Accordingly, it is easy to carry and store the projector 10 in the storage state.

Luminous flux representing an image formed by the image forming unit 26 is incident on the projection lens 11 from the body part 12. The projection lens 11 enlarges image light, which is based on the incident luminous flux, by an optical system and forms an image. Accordingly, the projection lens 11 projects the enlarged image of the image, which is formed by the image forming unit 26, on a screen 36 (see FIG. 4).

Since the projection lens 11 includes a bending optical system (see FIGS. 2 and 3) for bending an optical axis twice by way of example, the projection lens 11 has a substantially U-shape convex upward as a whole in the storage state shown in FIG. 1. The projection lens 11 comprises an incident-side end part 14A, an intermediate part 14B, and an emission-side end part 14C. The incident-side end part 14A is connected to one end of both ends of the intermediate part 14B, and the emission-side end part 14C is connected to the other end of both ends of the intermediate part 14B. Light emitted from the body part 12 is incident on the incident-side end part 14A. The emission-side end part 14C is provided with an emission lens 16. Light, which is incident on the incident-side end part 14A from the body part 12, is guided to the emission-side end part 14C through the intermediate part 14B. The emission-side end part 14C emits light, which is guided from the body part 12 through the incident-side end part 14A and the intermediate part 14B, to the screen 36 from the emission lens 16.

The incident-side end part 14A is mounted on the body part 12 and includes a first holding unit 15A (see FIG. 6), which will be described later, therein. The mounting position of the incident-side end part 14A is a position adjacent to the protruding portion 12B in a horizontal direction in FIG. 1, and is positioned near the middle of the base portion 12A. In the storage state of the projection lens 11, the intermediate part 14B extends from near the middle of the base portion 12A toward an end portion thereof opposite to the protruding portion 12B, that is, the left side in FIG. 1. Further, the intermediate part 14B includes a second holding unit 15B (see FIG. 6), which will be described later, therein. A corner 14D of the emission-side end part 14C and a corner 12F of the protruding portion 12B are disposed at positions that are substantially symmetric with each other in the horizontal direction in FIG. 1. The emission-side end part 14C includes a third holding unit 15C (see FIG. 6), which will be described later, therein.

Since the appearance of the emission-side end part 14C is formed in substantially the same shape as the appearance of the protruding portion 12B, the appearance of the projection lens 11 and the appearance of the body part 12 are caused to have unity. For this reason, the appearance of the projection lens 11 is designed as if the appearance of the projection lens 11 forms a part of the appearance of the body part 12 in the storage state.

Figure 2:
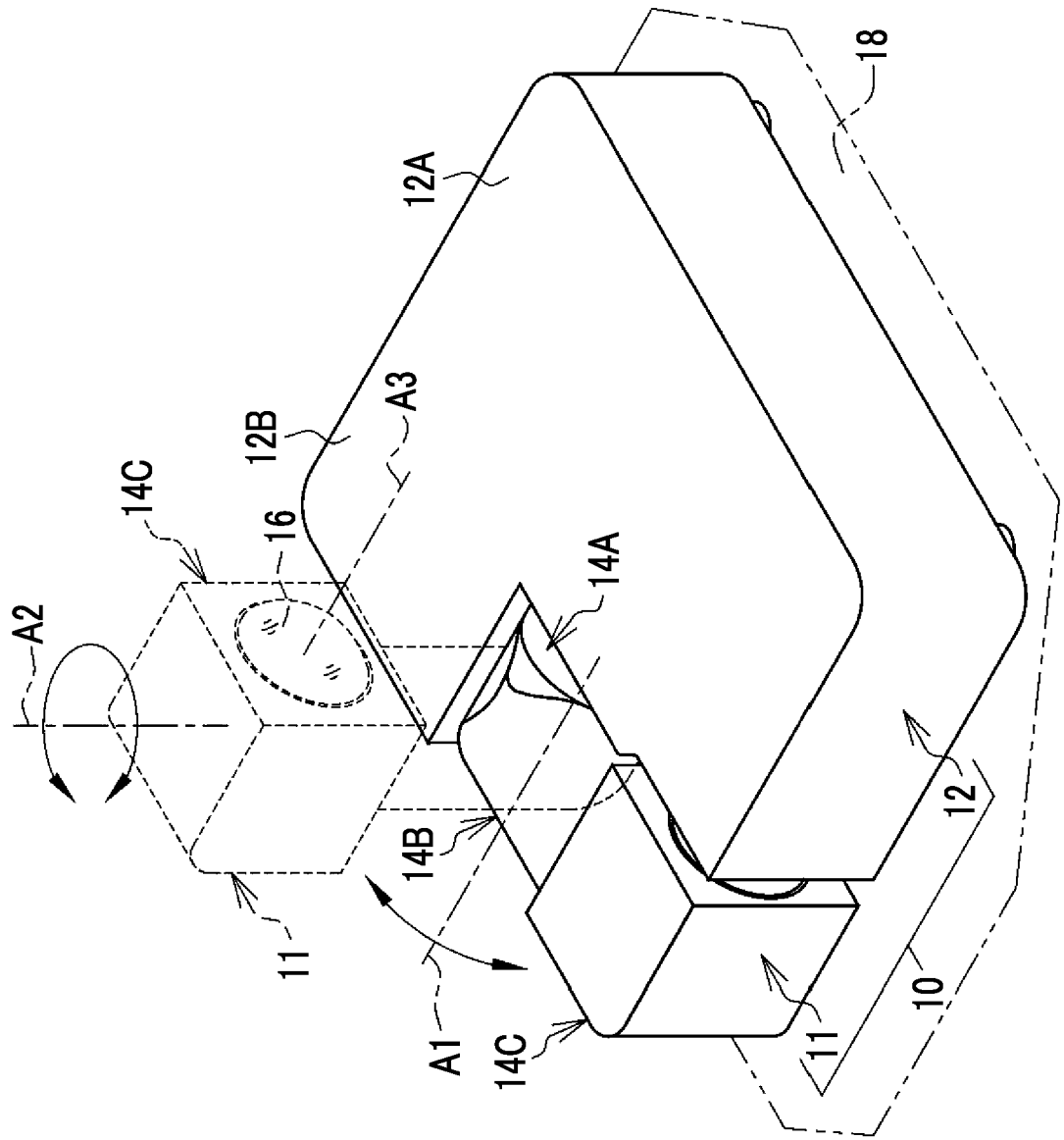
FIG. 2 is a perspective view of the horizontally placed projector.
Figure 3:
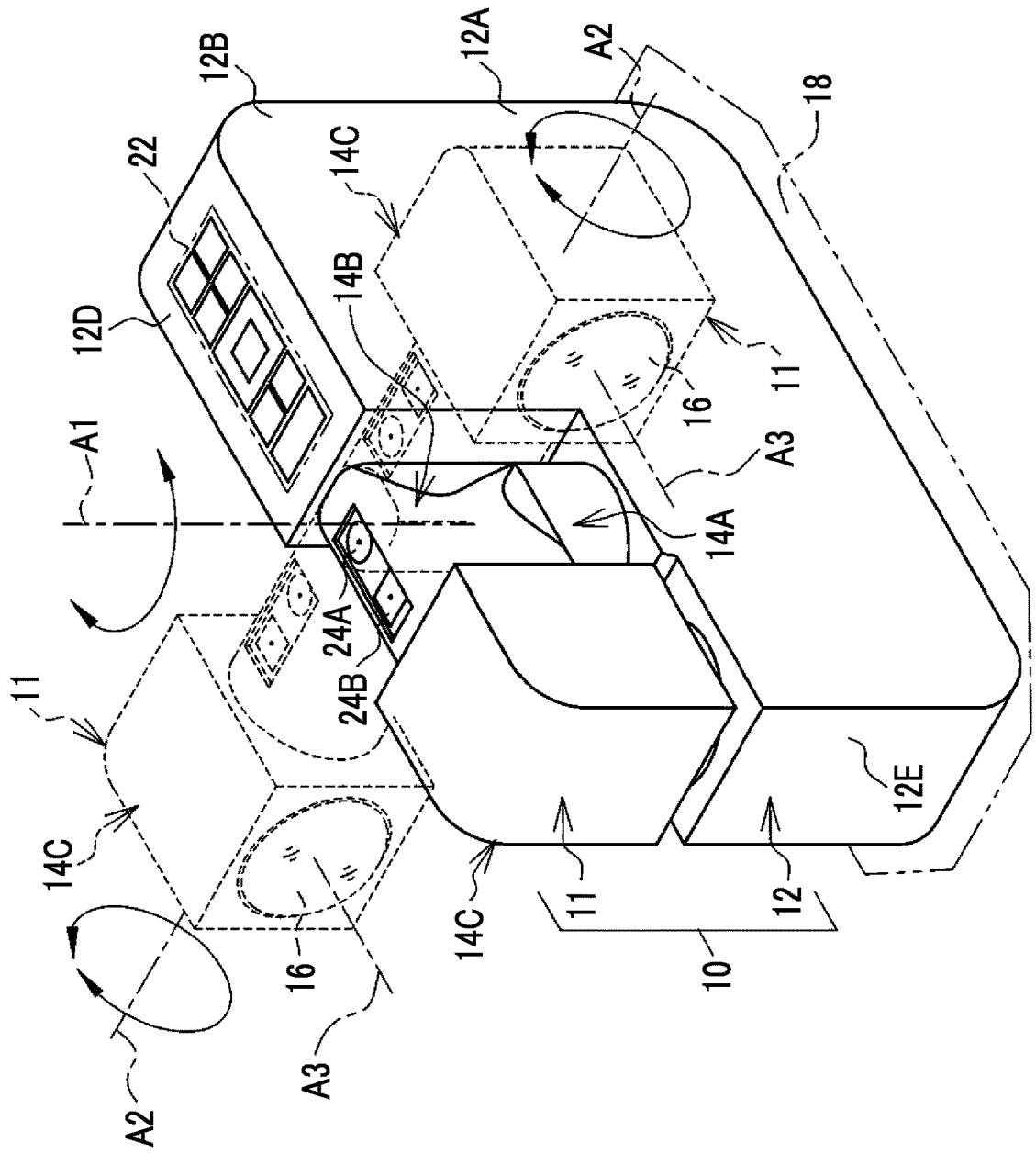
FIG. 3 is a perspective view of the vertically placed projector.

As shown in FIGS. 2 and 3, the projection lens 11 comprises the bending optical system. The bending optical system has a first optical axis A1, a second optical axis A2, and a third optical axis A3. The second optical axis A2 is an optical axis that is bent at an angle of 90° from the first optical axis A1. The third optical axis A3 is an optical axis that is bent at an angle of 90° from the second optical axis A2.

The incident-side end part 14A is non-rotatably mounted on the body part 12. The intermediate part 14B is rotatable about the first optical axis A1 with respect to the incident-side end part 14A. Since the emission-side end part 14C is connected to the intermediate part 14B, the emission-side end part 14C is also rotated about the first optical axis A1 in a case where the intermediate part 14B is rotated with respect to the incident-side end part 14A. A rotatable range about the first optical axis A1 is less than 360°, and is 180° in this example. The reason why the rotatable range about the first optical axis A1 is limited to less than 360° is to prevent interference between the protruding portion 12B and the projection lens 11 in a state where the protruding portion 12B is adjacent to the incident-side end part 14A.

Further, the emission-side end part 14C is rotatable about the second optical axis A2 with respect to the intermediate part 14B. The rotation of the emission-side end part 14C about the second optical axis A2 is not limited unlike the case of the intermediate part 14B. For example, the emission-side end part 14C can also be rotated at an angle of 360° or more.

In summary, the emission-side end part 14C is rotatable about two axes, which are the first optical axis A1 and the second optical axis A2, as rotation axes. Accordingly, a user can change the projection direction of the projection lens 11 without moving the body part 12.

FIG. 2 shows a state where the projector 10 is horizontally placed on an installation surface 18, and FIG. 3 shows a state where the projector 10 is vertically placed on the installation surface 18. As described above, the projector 10 can be used in a horizontal attitude and a vertical attitude.

As shown in FIG. 3, an operation panel 22 is provided on the side surface 12D of the protruding portion 12B. The operation panel 22 includes a plurality of operation switches. The operation switches are, for example, a power switch, adjustment switches, and the like. The adjustment switches are switches that are used to perform various adjustments. The adjustment switches include, for example, switches that are used to perform the image quality adjustment and keystone correction of an image projected on the screen 36.

A first unlock switch 24A and a second unlock switch 24B are provided on one surface of the intermediate part 14B. As described later, the projection lens 11 is provided with a first rotation locking mechanism 71 (see FIG. 6) and a second rotation locking mechanism 72 (see FIG. 6). The first rotation locking mechanism 71 locks the rotation of the intermediate part 14B about the first optical axis A1 with respect to the incident-side end part 14A. The second rotation locking mechanism 72 locks the rotation of the emission-side end part 14C about the second optical axis A2 with respect to the intermediate part 14B. The first unlock switch 24A is an operation switch that inputs an instruction to unlock the rotation of the intermediate part 14B to the first rotation locking mechanism 71. The second unlock switch 24B is an operation switch that inputs an instruction to unlock the rotation of the emission-side end part 14C to the second rotation locking mechanism 72.

Figure 4:
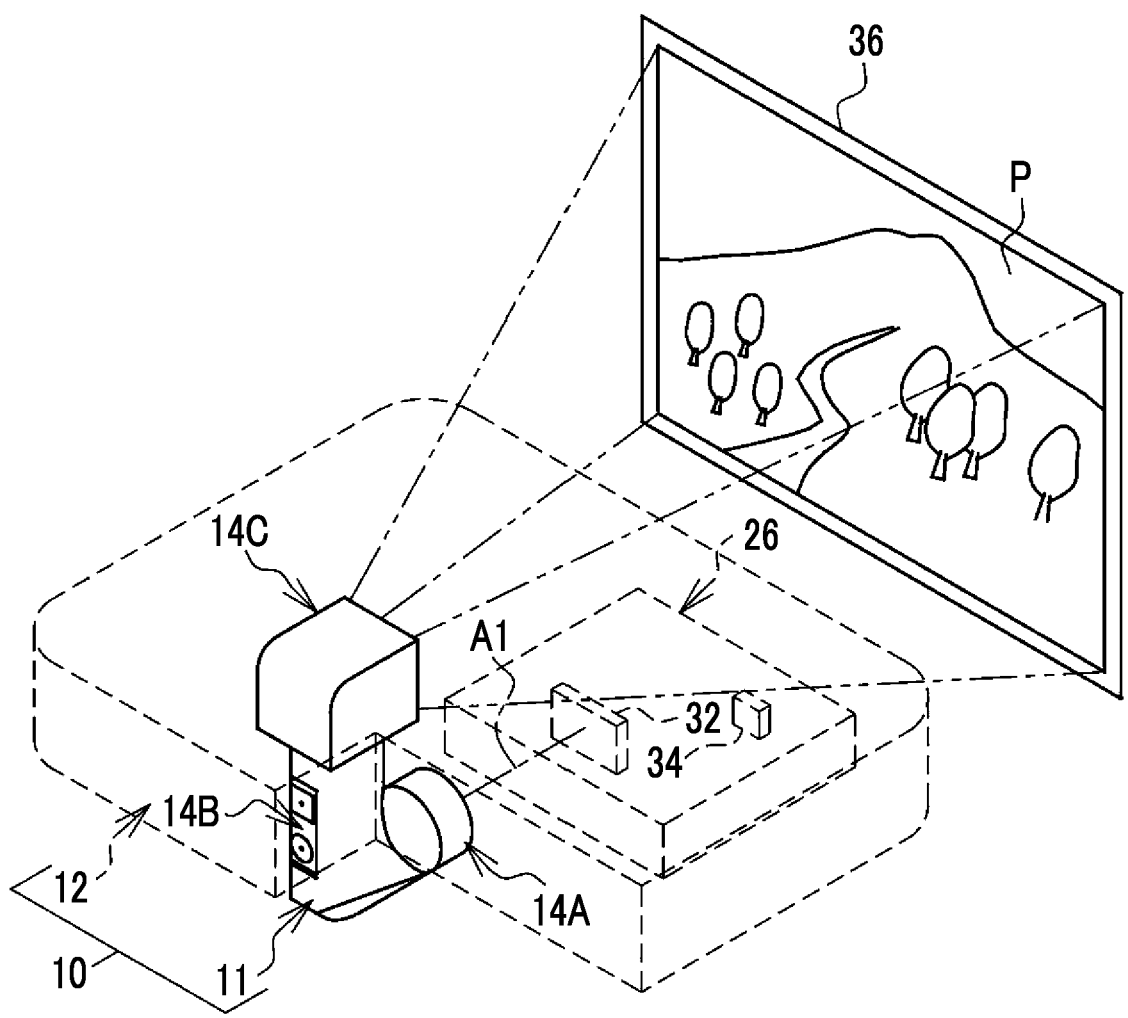
FIG. 4 is a diagram showing an aspect where the projector is used to project an image on a screen.

As shown in FIG. 4, the body part 12 is provided with the image forming unit 26. The image forming unit 26 forms an image to be projected. The image forming unit 26 comprises an image forming panel 32, a light source 34, a light guide member (not shown), and the like. The light source 34 applies light to the image forming panel 32. The light guide member guides light, which is applied from the light source 34, to the image forming panel 32. The image forming unit 26 is, for example, a reflection type image forming unit that uses a DMD as the image forming panel 32. As well known, the DMD is an image display element which includes a plurality of micro-mirrors capable of changing the reflection direction of light applied from the light source 34 and in which the respective micro-mirrors are two-dimensionally arranged in pixels. The DMD performs optical modulation corresponding to an image by changing the direction of each micro-mirror according to an image to switch the ON/OFF of reflected light of light applied from the light source 34. The image forming panel 32 is an example of an electro-optical element.

Examples of the light source 34 include a white light source. The white light source emits white light. The white light source is, for example, a light source that is realized from the combination of a laser light source and a phosphor. The laser light source emits blue light to the phosphor as excitation light. The phosphor emits yellow light in a case where the phosphor is excited by blue light emitted from the laser light source. The white light source emits white light by combining blue light that is emitted from the laser light source with yellow light that is emitted from the phosphor. The image forming unit 26 is further provided with a rotary color filter that selectively converts white light emitted from the light source 34 into each of blue light B (Blue), green light G (Green), and red light R (Red) in a time-sharing manner. In a case where each of blue light B, green light G, and red light R is selectively applied to the image forming panel 32, image light where image information about each of blue light B, green light G, and red light R is carried and supported is obtained. In a case where each color image light obtained in this way is selectively incident on the projection lens 11, each color image light is projected toward the screen 36. The respective color image lights are integrated with each other on the screen 36, so that a full color image P is displayed on the screen 36.

Figure 5:
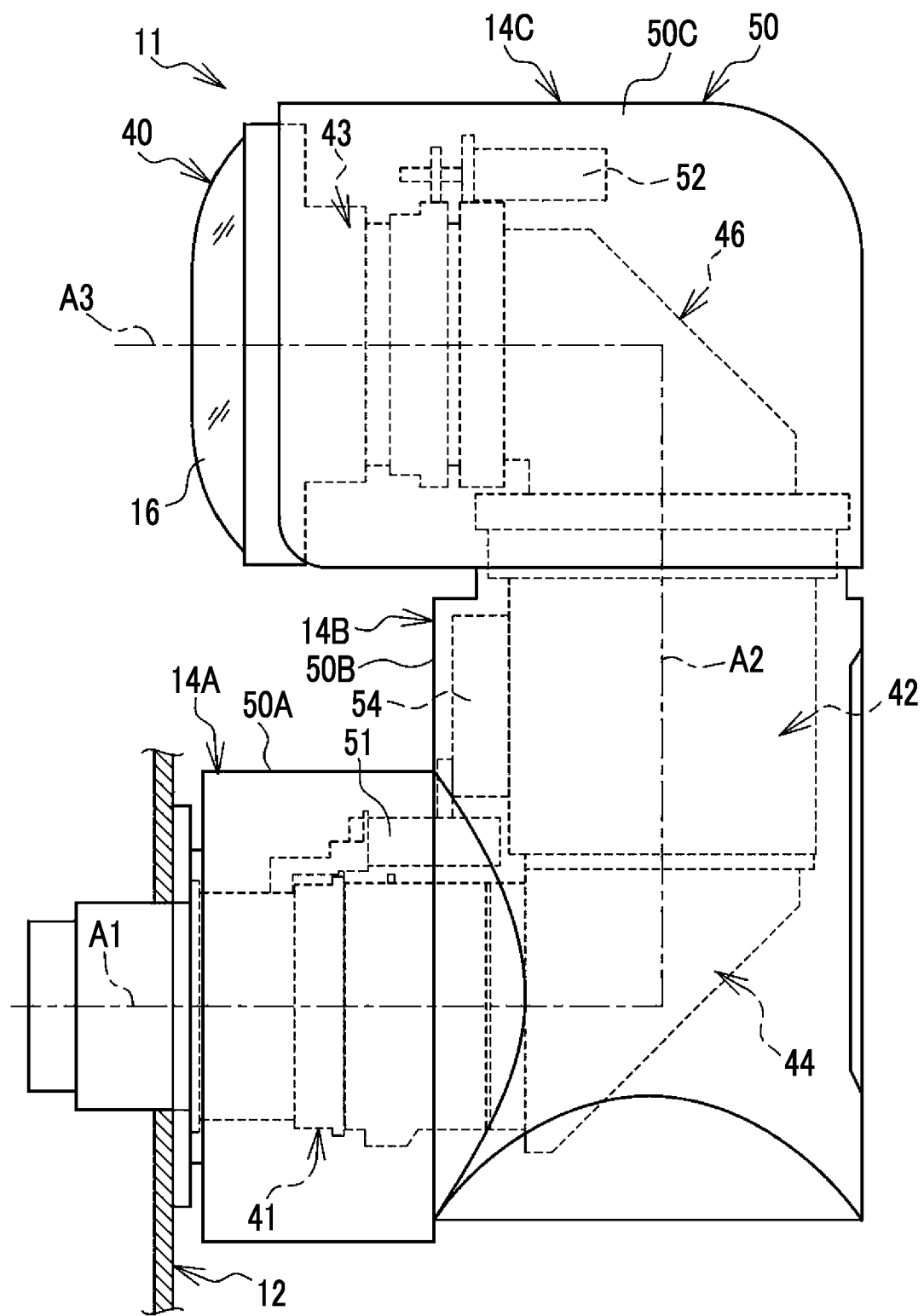
FIG. 5 is a side view of a projection lens.
Figure 6:
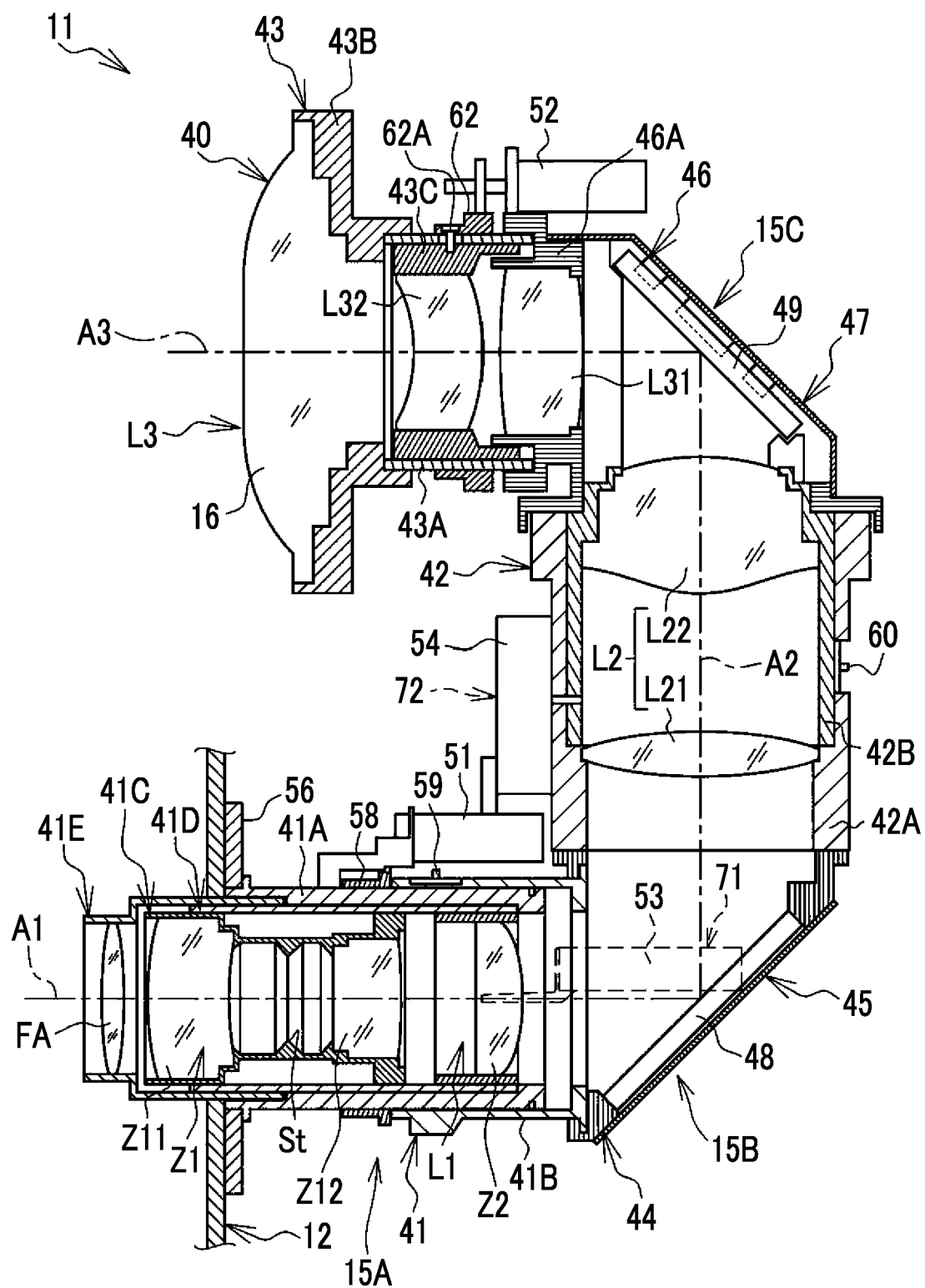
FIG. 6 is a longitudinal sectional view of the projection lens.

As shown in FIGS. 5 and 6, the projection lens 11 comprises a lens barrel 40. The lens barrel 40 houses the bending optical system. The lens barrel 40 comprises a first lens barrel unit 41, a second lens barrel unit 42, and a third lens barrel unit 43.

Each of the first lens barrel unit 41, the second lens barrel unit 42, and the third lens barrel unit 43 houses lenses. The lenses housed in the first lens barrel unit 41 are disposed on the first optical axis A1. The lenses housed in the second lens barrel unit 42 are disposed on the second optical axis A2. The lenses housed in the third lens barrel unit 43 are disposed on the third optical axis A3. The central axis of the first lens barrel unit 41 substantially coincides with the first optical axis A1. The central axis of the second lens barrel unit 42 substantially coincides with the second optical axis A2. The central axis of the third lens barrel unit 43 substantially coincides with the third optical axis A3. FIGS. 5 and 6 show the lens barrel 40 in the state shown in FIGS. 2 and 4. In this embodiment, in order to simplify description, the detailed configuration of the respective lenses will be omitted and the respective lenses will be represented like one lens. However, each lens may be a plurality of lenses. Further, the "optical system" may be composed of one lens or a plurality of lenses in this embodiment.

The first lens barrel unit 41 is a lens barrel unit that is positioned closest to the incident side, the third lens barrel unit 43 is a lens barrel unit that is positioned closest to the emission side, and the second lens barrel unit 42 is a lens barrel unit that is positioned between the first lens barrel unit 41 and the third lens barrel unit 43.

As shown in FIGS. 5 and 6, the projection lens 11 comprises the lens barrel 40. The lens barrel 40 houses the bending optical system. The lens barrel 40 comprises the first lens barrel unit 41, the second lens barrel unit 42, the third lens barrel unit 43, and a focus adjustment barrel 41E. Here, the first lens barrel unit 41 is an example of a "first holding unit" according to the technique of the disclosure. Further, a first mirror holding part 44 and a part of the second lens barrel unit 42 are an example of a "second holding unit" according to the technique of the disclosure. Furthermore, a second mirror holding part 46 and the third lens barrel unit 43 are an example of a "third holding unit" according to the technique of the disclosure. The second holding unit 15B including a part of the second lens barrel unit 42 is rotated with respect to the first holding unit 15A including the first lens barrel unit 41, and the third holding unit 15C including the third lens barrel unit 43 is rotated with respect to the second holding unit 15B. Further, the first holding unit 15A, the second holding unit 15B, and the third holding unit 15C hold various components of the projection lens 11. Here, examples of the various components include at least one or more of various optical systems, reflective parts, electric drive units, and the like.

In addition, the lens barrel 40 comprises the first mirror holding part 44 and the second mirror holding part 46. The first mirror holding part 44 holds a first mirror 48 and the second mirror holding part 46 holds a second mirror 49. Each of the first and second mirrors 48 and 49 is one of optical elements forming the bending optical system and is a reflective part that bends an optical axis. The first mirror 48 bends the first optical axis A1 to form the second optical axis A2. The second mirror 49 bends the second optical axis A2 to form the third optical axis A3. The first mirror holding part 44 is disposed between the first lens barrel unit 41 and the second lens barrel unit 42. The second mirror holding part 46 is disposed between the second lens barrel unit 42 and the third lens barrel unit 43.

A distal end portion of an inner barrel 42B of the second lens barrel unit 42 and a lens L22 held at the distal end portion are put into the second mirror holding part 46. Accordingly, since a distance between the lens L22 and the second mirror 49 is reduced, light emitted from the lens L22 can be reflected even though the second mirror 49 is reduced in size. Further, the second mirror holding part 46 can also be reduced in size together with a reduction in the size of the second mirror 49.

The lens barrel 40 is covered with an exterior cover 50 except for a part of the emission lens 16 and the like. The exterior cover 50 includes a first exterior cover 50A, a second exterior cover 50B, and a third exterior cover 50C. The first exterior cover 50A is an exterior cover corresponding to the incident-side end part 14A, the second exterior cover 50B is an exterior cover corresponding to the intermediate part 14B, and the third exterior cover 50C is an exterior cover corresponding to the emission-side end part 14C.

The first exterior cover 50A covers the first lens barrel unit 41 and forms the outer peripheral surface of the incident-side end part 14A. The second exterior cover 50B mainly covers the first mirror holding part 44 and the second lens barrel unit 42, and forms the outer peripheral surface of the intermediate part 14B. The third exterior cover 50C mainly covers the second mirror holding part 46 and the third lens barrel unit 43, and forms the outer peripheral surface of the emission-side end part 14C.

Further, various actuators are disposed on the outer peripheral surface of the lens barrel 40. Specifically, a zoom motor 51 is provided on the outer peripheral surface of the first lens barrel unit 41 and a focus motor 52 is provided on the outer peripheral surface of the second mirror holding part 46. Further, a solenoid 53 (see FIG. 6) is provided on the outer peripheral surface of the first mirror holding part 44, and a solenoid 54 is provided on the outer peripheral surface of the second lens barrel unit 42. The solenoid 53 forms the first rotation locking mechanism 71. The solenoid 54 forms the second rotation locking mechanism 72. The zoom motor 51, the focus motor 52, the solenoid 53, and the solenoid 54 are examples of the electric drive units.

In FIG. 6, the first lens barrel unit 41 comprises an inner barrel 41A, an outer barrel 41B, a zoom lens barrel 41C, a cam barrel 41D, and a focus adjustment barrel 41E. A flange 56, which protrudes outward in the radial direction of the inner barrel 41A, is provided at an incident-side end portion of the inner barrel 41A on the first optical axis A1. The flange 56 fixes the inner barrel 41A to the body part 12 so that the inner barrel 41A is not rotatable. The outer barrel 41B is disposed on the emission side of the inner barrel 41A, and covers a part of the outer peripheral surface of the inner barrel 41A. The outer barrel 41B is mounted on the inner barrel 41A so as to be rotatable about the first optical axis A1.

The first lens barrel unit 41 holds a first optical system L1. The first optical system L1 is composed of, for example, a lens FA, a lens group Z1, and a lens Z2 and is disposed on the first optical axis A1. The lens group Z1 is composed of a lens Z11 and a lens Z12. The cam barrel 41D and the zoom lens barrel 41C are housed in the inner barrel 41A. The zoom lens barrel 41C includes two groups of zoom lenses. The two groups of zoom lenses are composed of the lens group Z1 and the lens Z2.

A first cam groove (not shown) and a second cam groove (not shown) are formed on the cam barrel 41D. The first cam groove is a cam groove that is used to move the lens group Z1. The second cam groove is a cam groove that is used to move the lens Z2. A lens holding frame of the lens group Z1 is provided with a first cam pin (not shown). A lens holding frame of the lens Z2 is provided with a second cam pin (not shown). The first cam pin is inserted into the first cam groove and the second cam pin is inserted into the second cam groove.

In a case where the cam barrel 41D is rotated about the first optical axis A1, the lens group Z1 is moved along the first cam groove and the first optical axis A1 and the lens Z2 is moved along the second cam groove and the first optical axis A1. In a case where the lens group Z1 and the lens Z2 are moved along the first optical axis A1 as described above, the position of the lens group Z1 on the first optical axis is changed, the position of the lens Z2 on the first optical axis A1 is changed, and an interval between the lens group Z1 and the lens Z2 is changed. Accordingly, zooming is performed.

The cam barrel 41D is rotated by the drive of the zoom motor 51. A cylindrical gear 58 is provided on the outside of the inner barrel 41A. The gear 58 is rotated around the inner barrel 41A by the drive of the zoom motor 51. The gear 58 is provided with a drive pin (not shown) that is used to rotate the cam barrel 41D. In a case where the gear 58 is rotated, the drive pin is also rotated in the circumferential direction of the inner barrel 41A and the cam barrel 41D is rotated as the drive pin is rotated. In order to prevent interference with the drive pin, an insertion groove (not shown) into which the drive pin is to be inserted is formed on the inner barrel 41A in the circumferential direction.

Further, a stationary stop St is provided between the lenses Z11 and Z12 in the zoom lens barrel 41C. The stationary stop St narrows luminous flux incident from the body part 12. Since the stationary stop St is provided in the zoom lens barrel 41C, a telecentric optical system in which the size of an image is not changed at the center and the periphery of an image forming plane regardless of the incident height of luminous flux is realized.

The focus adjustment barrel 41E is mounted on the incident-side end portion of the inner barrel 41A and is rotatable about the first optical axis A1 with respect to the inner barrel 41A. A thread groove is formed on each of the outer peripheral surface of an emission-side end portion of the focus adjustment barrel 41E and the inner peripheral surface of the inner barrel 41A, and the respective thread grooves mesh with each other. Since the inner barrel 41A is fixed to the body part 12, the focus adjustment barrel 41E is moved along the first optical axis A1 due to the action of threads in a case where the focus adjustment barrel 41E is rotated with respect to the inner barrel 41A.

The focus adjustment barrel 41E holds a lens FA for adjusting a focus. The lens FA is moved along the first optical axis A1 to adjust the relative position adjust the relative position of the focusing position of the entire system of the projection lens 11 relative to the image forming panel 32. In a case where the projection lens 11 is mounted on the body part 12, an individual difference occurs in the mounting position of the projection lens 11 relative to the image forming panel 32. The focus adjustment barrel 41E is provided to absorb this individual difference occurring during manufacture so that the relative position of the focusing position of the entire system of the projection lens 11 relative to the image forming panel 32 is substantially constant.

A first rotational position detection sensor 59 is provided on the outer peripheral surface of the outer barrel 41B. The first rotational position detection sensor 59 detects the rotational position of the outer barrel 41B with respect to the inner barrel 41A.

The first mirror holding part 44 is integrally mounted on an emission-side end portion of the outer barrel 41B. For this reason, the first mirror holding part 44 is rotated about the first optical axis A1 as the outer barrel 41B is rotated about the first optical axis A1 with respect to the inner barrel 41A. The first mirror holding part 44 holds the first mirror 48 in an attitude where the reflective surface of the first mirror 48 forms an angle of 45° with respect to each of the first optical axis A1 and the second optical axis A2. The first mirror 48 is a specular reflection mirror of which a transparent member, such as glass, is coated with a reflective film.

The second lens barrel unit 42 comprises an outer barrel 42A and an inner barrel 42B. An incident-side end portion of the outer barrel 42A is integrally mounted on the first mirror holding part 44. The inner barrel 42B is mounted on the outer barrel 42A so as to be rotatable about the second optical axis A2.

The second lens barrel unit 42 holds a second optical system L2. The second optical system L2 is composed of, for example, a lens L21 and a lens L22 and is disposed on the second optical axis A2. The outer barrel 42A holds the lens L21. The inner barrel 42B holds the lens L22.

In this example, the second optical system L2 functions as a relay lens. More specifically, the first optical system L1 of the first lens barrel unit 41 forms an intermediate image in the first mirror holding part 44. The second optical system L2 uses this intermediate image as a subject and relays luminous flux representing the intermediate image to the second mirror holding part 46 and the third lens barrel unit 43.

The second mirror holding part 46 is integrally mounted on an emission-side end portion of the inner barrel 42B of the second lens barrel unit 42. For this reason, the second mirror holding part 46 is rotated about the second optical axis A2 as the inner barrel 42B is rotated about the second optical axis A2 with respect to the outer barrel 42A.

A second rotational position detection sensor 60 is provided on the outer peripheral surface of the outer barrel 42A. The second rotational position detection sensor 60 detects the rotational position of the inner barrel 42B with respect to the outer barrel 42A.

The second mirror holding part 46 holds the second mirror 49 in an attitude where the reflective surface of the second mirror 49 forms an angle of 45° with respect to each of the second optical axis A2 and the third optical axis A3. The second mirror 49 is the same specular reflection mirror as the first mirror 48.

An emission-side end portion 46A of the second mirror holding part 46 forms the third lens barrel unit 43. The third lens barrel unit 43 comprises a stationary barrel 43A, an emission lens holding frame 43B, and a focus lens barrel 43C in addition to the end portion 46A.

The third lens barrel unit 43 holds a third optical system L3. The third optical system L3 is composed of, for example, a lens L31, a lens L32, and the emission lens 16 and is disposed on the third optical axis A3. The end portion 46A is a tubular portion of which the central axis substantially coincides with the third optical axis A3, and functions as a lens holding frame that holds the lens L31.

The stationary barrel 43A is integrally mounted on the emission side of the end portion 46A. The emission lens holding frame 43B is integrally mounted on an emission-side end portion of the stationary barrel 43A. The stationary barrel 43A holds the focus lens barrel 43C on the inner peripheral side thereof so that the focus lens barrel 43C is movable in the direction of the third optical axis A3. The focus lens barrel 43C holds the lens L32 for focus.

A gear 62 is provided on the outer periphery of the stationary barrel 43A. The gear 62 is rotated in the circumferential direction of the stationary barrel 43A by the drive of the focus motor 52. A thread groove is formed on the inner peripheral surface of the gear 62. A thread groove is formed even on the outer peripheral surface of the stationary barrel 43A. The thread groove formed on the inner peripheral surface of the gear 62 and the thread groove formed on the outer peripheral surface of the stationary barrel 43A mesh with each other. For this reason, in a case where the gear 62 is rotated, the gear 62 is moved with respect to the stationary barrel 43A in the direction of the third optical axis A3. The gear 62 is provided with a drive pin 62A, and the drive pin 62A is inserted into the focus lens barrel 43C. Accordingly, as the gear 62 is moved, the focus lens barrel 43C is also moved along the third optical axis A3. A focusing position depending on a distance between the screen 36 and the projection lens 11 is adjusted as the focusing position of the projection lens 11 by the movement of the focus lens barrel 43C.

Next, the configuration of a part of the projection lens 11 will be specifically described from a first point of view.

As described above, the projection lens 11 comprises the first mirror 48, the first mirror holding part 44, the second lens barrel unit 42 that comprises the outer barrel 42A and the inner barrel 42B, the second mirror 49, and the second mirror holding part 46 (see FIG. 6). Further, the projection lens 11 comprises the third exterior cover 50C as described above (see FIG. 5). Furthermore, the projection lens 11 comprises a first holding unit cover 45 and a second holding unit cover 47 as shown in FIG. 6. Further, the first holding unit 15A, the second holding unit 15B, and the third holding unit 15C hold various optical systems, reflective parts, electric drive units, and the like of the projection lens 11.

The first mirror 48 is an example of a second reflective part. The second mirror 49 is an example of a first reflective part. The inner barrel 42B of the second lens barrel unit 42 is an example of a first holding frame. The second mirror holding part 46 is an example of a second holding frame. The first mirror holding part 44 is an example of a third holding frame. The second holding unit cover 47 is an example of a first cover member. The third exterior cover 50C is an example of a second cover member.

In the projection lens 11, as shown in FIG. 6, the first mirror 48 reflects light, which is emitted from the body part 12 (see FIG. 1) and is parallel to the first optical axis A1, to form light parallel to the second optical axis A2. The light parallel to the second optical axis A2 passes through the outer barrel 42A and the inner barrel 42B of the second lens barrel unit 42. In other words, light emitted from the body part 12 passes through the outer barrel 42A and the inner barrel 42B of the second lens barrel unit 42. Then, the second mirror 49 reflects light, which is emitted from the outer barrel 42A and the inner barrel 42B of the second lens barrel unit 42 and is parallel to the second optical axis A2, to form light parallel to the third optical axis A3. In this specification, "reflect" and "bend" are used in the same meaning.

The inner barrel 42B of the second lens barrel unit 42 holds the lens L22 that is disposed on the second optical axis A2. The outer barrel 42A of the second lens barrel unit 42 holds the lens L21 that is disposed on the second optical axis A2. That is, the inner barrel 42B and the outer barrel 42A of the second lens barrel unit 42 function as holding frames that hold lenses.

As described above, the inner barrel 42B of the second lens barrel unit 42 is mounted on the outer barrel 42A of the second lens barrel unit 42 so as to be rotatable about the second optical axis A2. The second mirror holding part 46 is integrally provided on the inner barrel 42B of the second lens barrel unit 42 as described above. Accordingly, the second mirror holding part 46 is rotatable about the second optical axis A2 with respect to the outer barrel 42A.

Figure 7:
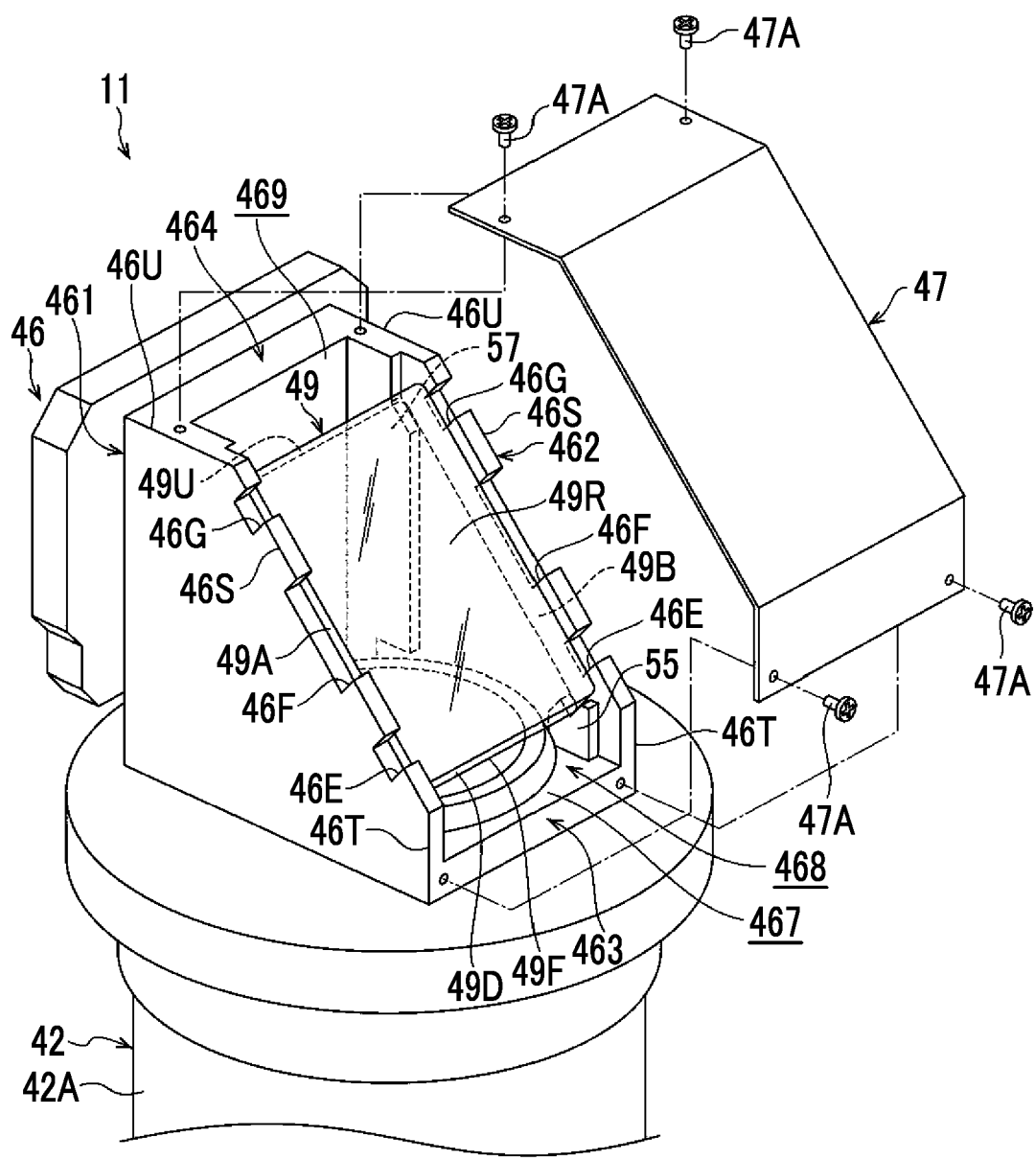
FIG. 7 is a perspective view of a second mirror and a second mirror holding part.
Figure 8:
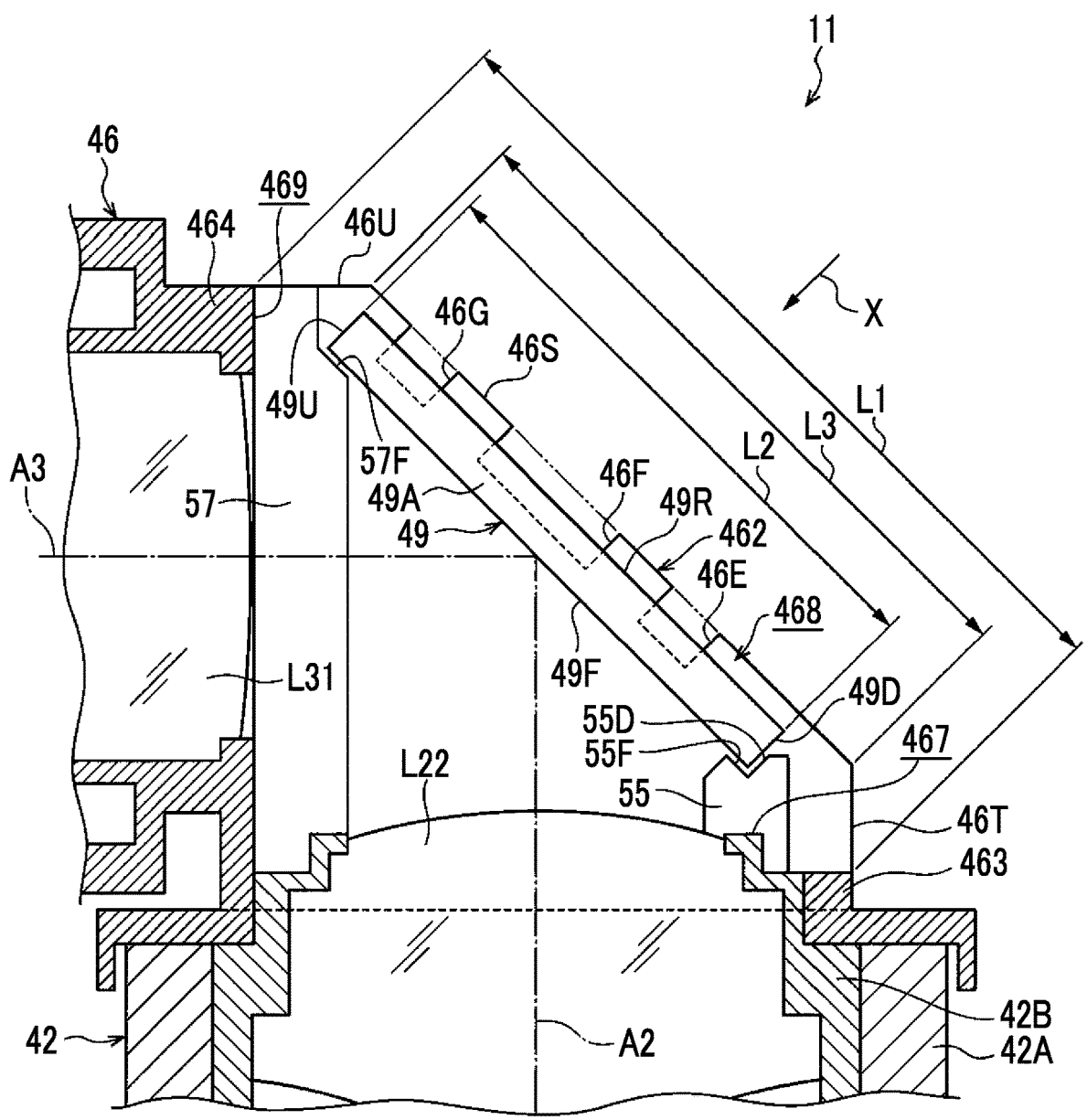
FIG. 8 is a longitudinal sectional view of the second mirror and the second mirror holding part.
Figure 9:
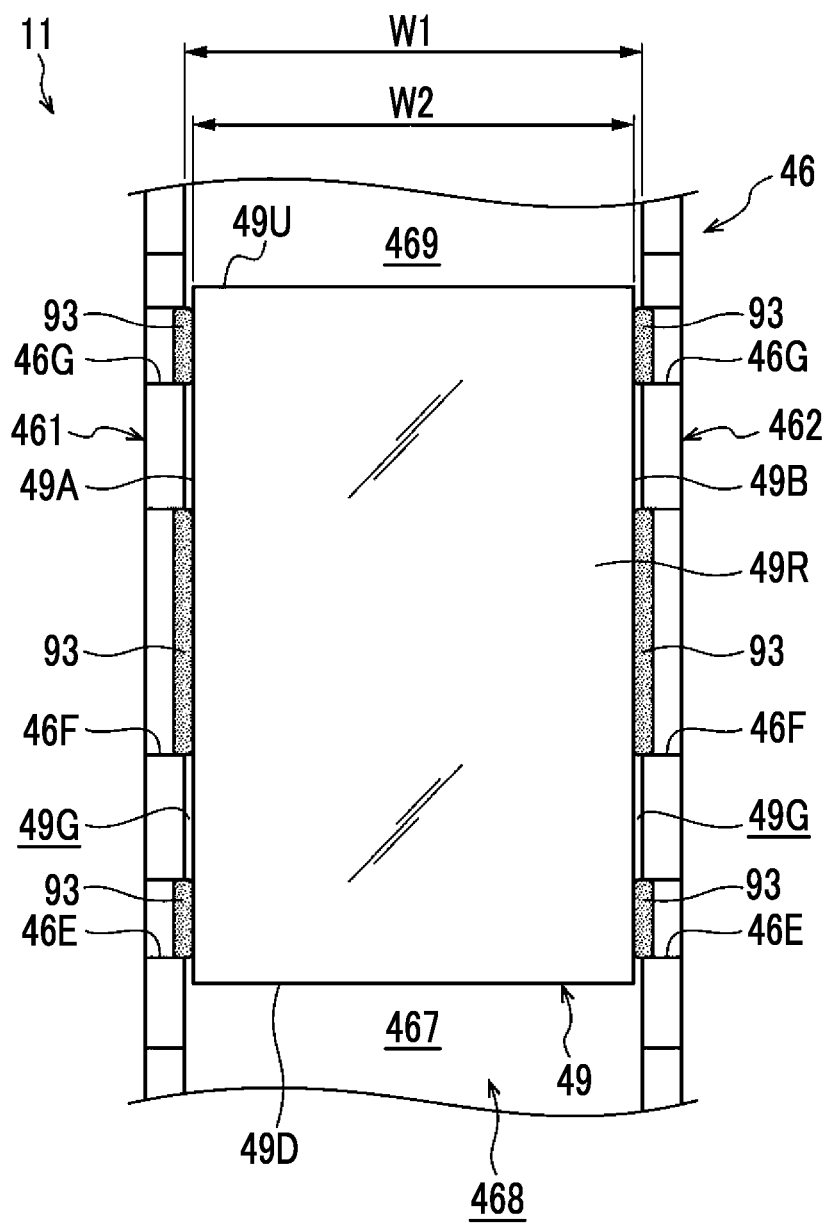
FIG. 9 is a diagram showing the second mirror and the second mirror holding part that are viewed from the back side of the second mirror in a thickness direction of the second mirror (the direction of an arrow X of FIG. 8).

As shown in FIGS. 7, 8, and 9, the second mirror 49 has the shape of a rectangular plate. Specifically, the second mirror 49 includes a surface 49F, a back 49R, a first side surface 49A, a second side surface 49B, a first end face 49D, and a second end face 49U.

As shown in FIG. 8, the surface 49F is a reflective surface that reflects light parallel to the second optical axis A2. The back 49R is a surface opposite to the surface 49F. The surface 49F and the back 49R face each other. Specifically, the surface 49F and the back 49R are disposed substantially parallel to each other.

The first side surface 49A is a left side surface in FIG. 9. The second side surface 49B is a right side surface in FIG. 9. The first side surface 49A and the second side surface 49B face each other. More specifically, the first side surface 49A and the second side surface 49B are disposed substantially parallel to each other. The first side surface 49A and the second side surface 49B are examples of side surfaces of the first reflective part.

The first end face 49D is a lower surface in FIG. 9. The second end face 49U is an upper surface in FIG. 9. The first end face 49D and the second end face 49U face each other. More specifically, the first end face 49D and the second end face 49U are surfaces substantially parallel to each other. The first end face 49D and the second end face 49U are an example of a pair of side surfaces facing each other.

As shown in FIG. 7, the second mirror holding part 46 includes a first side wall 461, a second side wall 462, a first connection wall 463, a second connection wall 464, and an opening portion 468.

As shown in FIGS. 7 and 8, each of the first and second side walls 461 and 462 is formed in a substantially pentagonal shape including an oblique side 46S, a first side 46T, and a second side 46U in a side view. The oblique side 46S is a side along the back 49R of the second mirror 49 in a side view. Specifically, the oblique side 46S forms an angle of about 45° with respect to each of the second optical axis A2 and the third optical axis A3.

The first side 46T is a side that extends from one end (a lower end in FIG. 8) of the oblique side 46S along the second optical axis A2 in a direction (a downward direction in FIG. 8) opposite to the traveling direction of light. The second side 46U is a side that extends from the other end (an upper end in FIG. 8) of the oblique side 46S along the third optical axis A3 in the traveling direction of light (a left direction in FIG. 8).

As shown in FIG. 7, the first connection wall 463 connects an incident-side end portion (a lower portion in FIG. 7) of the first side wall 461 to an incident-side end portion (a lower portion in FIG. 7) of the second side wall 462. The second connection wall 464 connects an emission-side end portion (a left end portion in FIG. 7) of the first side wall 461 to an emission-side end portion (a left end portion in FIG. 7) of the second side wall 462.

The opening portion 468 is formed between the oblique side 46S of the first side wall 461 and the oblique side 46S of the second side wall 462. The opening portion 468 is positioned in a region between the first side 46T of the first side wall 461 and the first side 46T of the second side wall 462. In addition, the opening portion 468 is positioned in a region between the second side 46U of the first side wall 461 and the second side 46U of the second side wall 462.

A width W1 (see FIG. 9) of the opening portion 468 is larger than a width W2 (see FIG. 9) of the second mirror 49. The width W1 of the opening portion 468 corresponds to a distance in a width direction (a horizontal direction in FIG. 9) between the inner wall of the first side wall 461 and the inner wall of the second side wall 462. The width W2 of the second mirror 49 corresponds to a distance in the width direction (the horizontal direction in FIG. 9) between the first side surface 49A and the second side surface 49B of the second mirror 49. Further, the first side surface 49A of the second mirror 49 has a gap 49G between itself and the inner wall of the first side wall 461. The second side surface 49B of the second mirror 49 has a gap 49G between itself and the inner wall of the second side wall 462.

A length L1 (see FIG. 8) of the opening portion 468 is longer than a length L2 (see FIG. 8) of the second mirror 49. The length L1 of the opening portion 468 corresponds to a length in a longitudinal direction (a vertical direction in FIG. 9) orthogonal to the width direction (the horizontal direction in FIG. 9) of the opening portion 468 in a case where the second mirror 49 is viewed in a thickness direction (the direction of an arrow X of FIG. 8). The length L2 of the second mirror 49 corresponds to a length in the longitudinal direction between the first end face 49D and the second end face 49U of the second mirror 49. A difference between the length L1 of the opening portion 468 and the length L2 of the second mirror 49 is larger than a difference between the width W1 of the opening portion 468 and the width W2 of the second mirror 49. Further, the length L2 of the second mirror 49 is set to be shorter than a length L3 of the oblique side 46S of each of the first and second side walls 461 and 462.

Furthermore, as shown in FIGS. 7 and 8, the second mirror 49 is disposed between the first and second side walls 461 and 462 along the oblique sides 46S of the first and second side walls 461 and 462 so as to close the middle portion of the opening portion 468 in the longitudinal direction.

As shown in FIGS. 7, 8, and 9, recessed portions 46E, 46F, and 46G are formed at each of the oblique side 46S of the first side wall 461 and the oblique side 46S of the second side wall 462. The recessed portions 46E, 46F, and 46G are an example of second holes.

The recessed portions 46E, 46F, and 46G of the first side wall 461 face the first side surface 49A of the second mirror 49. The recessed portions 46E, 46F, and 46G open to a side facing the first side surface 49A of the second mirror 49 and a side opposite thereto. That is, the recessed portions 46E, 46F, and 46G extend in the thickness direction of the first side wall 461. In addition, the recessed portions 46E, 46F, and 46G also open to a side facing the second holding unit cover 47 (an oblique upper-right side in FIG. 8). The recessed portion 46F is disposed at the middle portion of the oblique side 46S of the first side wall 461. The recessed portions 46E and 46G are disposed on both sides of the recessed portion 46F. The length of the recessed portion 46F along the oblique side 46S is set to be longer than the length of each of the recessed portions 46E and 46G along the oblique side 46S.

The recessed portions 46E, 46F, and 46G of the second side wall 462 face the second side surface 49B of the second mirror 49. The recessed portions 46E, 46F, and 46G open to a side facing the second side surface 49B of the second mirror 49 and a side opposite thereto. That is, the recessed portions 46E, 46F, and 46G extend in the thickness direction of the second side wall 462. In addition, the recessed portions 46E, 46F, and 46G also open to a side facing the second holding unit cover 47 (an oblique upper-right side in FIG. 8). The recessed portion 46F is disposed at the central portion of the oblique side 46S of the second side wall 462. The recessed portions 46E and 46G are disposed on both sides of the recessed portion 46F. The length of the recessed portion 46F along the oblique side 46S is set to be longer than the length of each of the recessed portions 46E and 46G along the oblique side 46S.

The recessed portions 46E, 46F, and 46G formed at the first and second side walls 461 and 462 are application spaces to which an adhesive 93 is applied as shown in FIG. 9. The adhesive 93 is applied between the first and second side surfaces 49A and 49B of the second mirror 49 and the first and second side walls 461 and 462 of the second mirror holding part 46 through the recessed portions 46E, 46F, and 46G. Accordingly, the second mirror 49 adheres to the second mirror holding part 46. That is, the second mirror holding part 46 functions as a holding frame that holds the second mirror 49. In a state where the second mirror 49 is held by the second mirror holding part 46, the second mirror 49 is not in contact with the second mirror holding part 46.

The adhesive 93 is an active energy ray-curable resin. Specifically, an ultraviolet-curing resin, which is cured by being irradiated with ultraviolet rays, is used as the adhesive 93. The adhesive 93 may be a resin that is cured by being irradiated with an active energy ray. An active energy ray is an electromagnetic wave that cures a resin in a case where the resin is irradiated with the electromagnetic wave. Specifically, examples of an active energy ray include visible light, ultraviolet rays, X-rays, electron beams, and the like.

The back 49R of the second mirror 49 does not adhere to the second mirror holding part 46. Further, the first end face 49D and the second end face 49U of the second mirror 49 do not adhere to the second mirror holding part 46.

Furthermore, since the second mirror 49 closes the middle portion of the opening portion 468 in the longitudinal direction, a first insertion hole 467 is formed on the incident side (the lower side in FIG. 8) of the first end face 49D of the second mirror 49. In other words, the first insertion hole 467 is provided at a position corresponding to the first end face 49D of the second mirror 49. Since the first insertion hole 467 is formed as described above, the first end face 49D of the second mirror 49 has a gap between itself and the first connection wall 463 of the second mirror holding part 46.

In addition, a second insertion hole 469 is formed on the emission side (the left side in FIG. 8) of the second end face 49U of the second mirror 49. In other words, the second insertion hole 469 is provided at a position corresponding to the second end face 49U of the second mirror 49. Since the second insertion hole 469 is formed as described above, the second end face 49U of the second mirror 49 has a gap between itself and the second connection wall 464 of the second mirror holding part 46. Accordingly, in this embodiment, each of all side surfaces (the first side surface 49A, the second side surface 49B, the first end face 49D, and the second end face 49U) of the second mirror 49 has a gap between itself and the second mirror holding part 46. The entire surface of each side surface does not need to be in contact with the second mirror holding part 46, and a part of each side surface may not be partially in contact with the second mirror holding part 46.

The first and second insertion holes 467 and 469 are an example of a pair of first holes. Specifically, the first insertion hole 467 is a void that is surrounded by the first end face 49D of the second mirror 49, the first side wall 461, the second side wall 462, and the first connection wall 463 (see FIG. 7). Specifically, the second insertion hole 469 is a void that is surrounded by the second end face 49U of the second mirror 49, the first side wall 461, the second side wall 462, and the second connection wall 464 (see FIG. 7).

Figure 10:
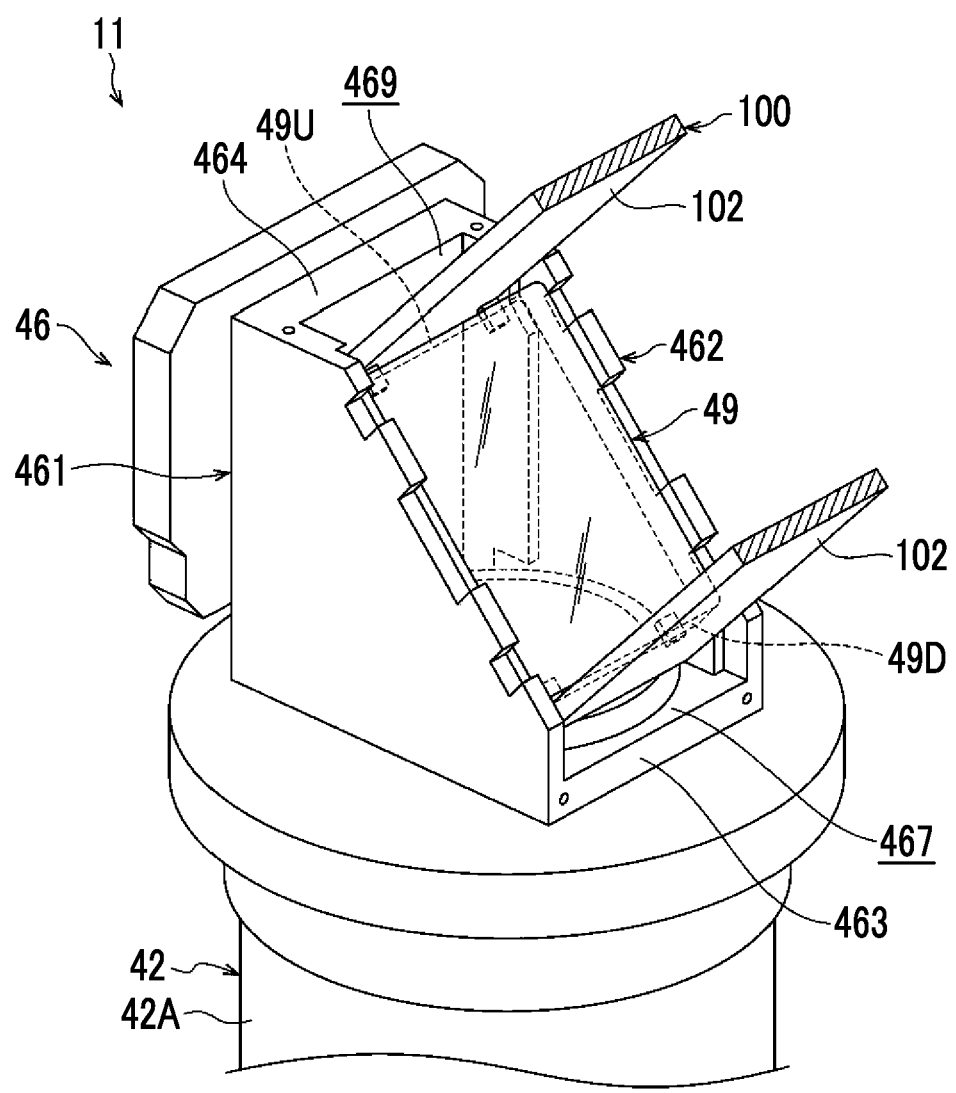
FIG. 10 is a perspective view showing an aspect where the attitude of the second mirror is adjusted using a holding device.

As shown in FIG. 10, a holding device 100 used to adjust the attitude of the second mirror 49 can be inserted into each of the first and second insertion holes 467 and 469. The holding device 100 includes a pair of support parts 102 that supports the second mirror 49. In this embodiment, the pair of support parts 102 can support the second mirror 49 in a state where the pair of support parts 102 is inserted into the first and second insertion holes 467 and 469, respectively. Specifically, the pair of support parts 102 can support the second mirror 49 from the first end face 49D and the second end face 49U of the second mirror 49. Then, in a state where the pair of support parts 102 supports the second mirror 49, the second mirror 49 is moved two-dimensionally or three-dimensionally, so that the attitude of the second mirror 49 is adjusted. After the attitude of the second mirror 49 is adjusted, the second mirror 49 is fixed by the adhesive 93 (see FIG. 9) as described above. Accordingly, the third optical axis A3 is adjusted. The attitude of the second mirror 49 is adjusted, for example, before the projector 10 is shipped as a product.

As shown in FIGS. 7 and 8, each of the first and second side walls 461 and 462 is provided with a receiving portion 55 that receives one end portion (an end portion corresponding to the first end face 49D) of the second mirror 49. Further, each of the first and second side walls 461 and 462 is provided with a receiving portion 57 that receives the other end portion (an end portion corresponding to the second end face 49U) of the second mirror 49. Only the receiving portions 55 and 57 of the second side wall 462 are shown in FIGS. 7 and 8. The receiving portions 55 and 57 have a function to receive the second mirror 49 in a case where the second mirror 49 fixed to the second mirror holding part 46 by the adhesive 93 falls off.

Specifically, as shown in FIG. 8, the receiving portion 55 includes an opposite surface 55F that faces the surface 49F of the second mirror 49 with a gap therebetween and an opposite surface 55D that faces the first end face 49D of the second mirror 49 with a gap therebetween. The receiving portion 55 including the opposite surfaces 55F and 55D is not in contact with the second mirror 49.

Specifically, as shown in FIG. 8, the receiving portion 57 includes an opposite surface 57F that faces the surface 49F of the second mirror 49 with a gap therebetween. The receiving portion 57 including the opposite surface 57F is not in contact with the second mirror 49.

Figure 11:
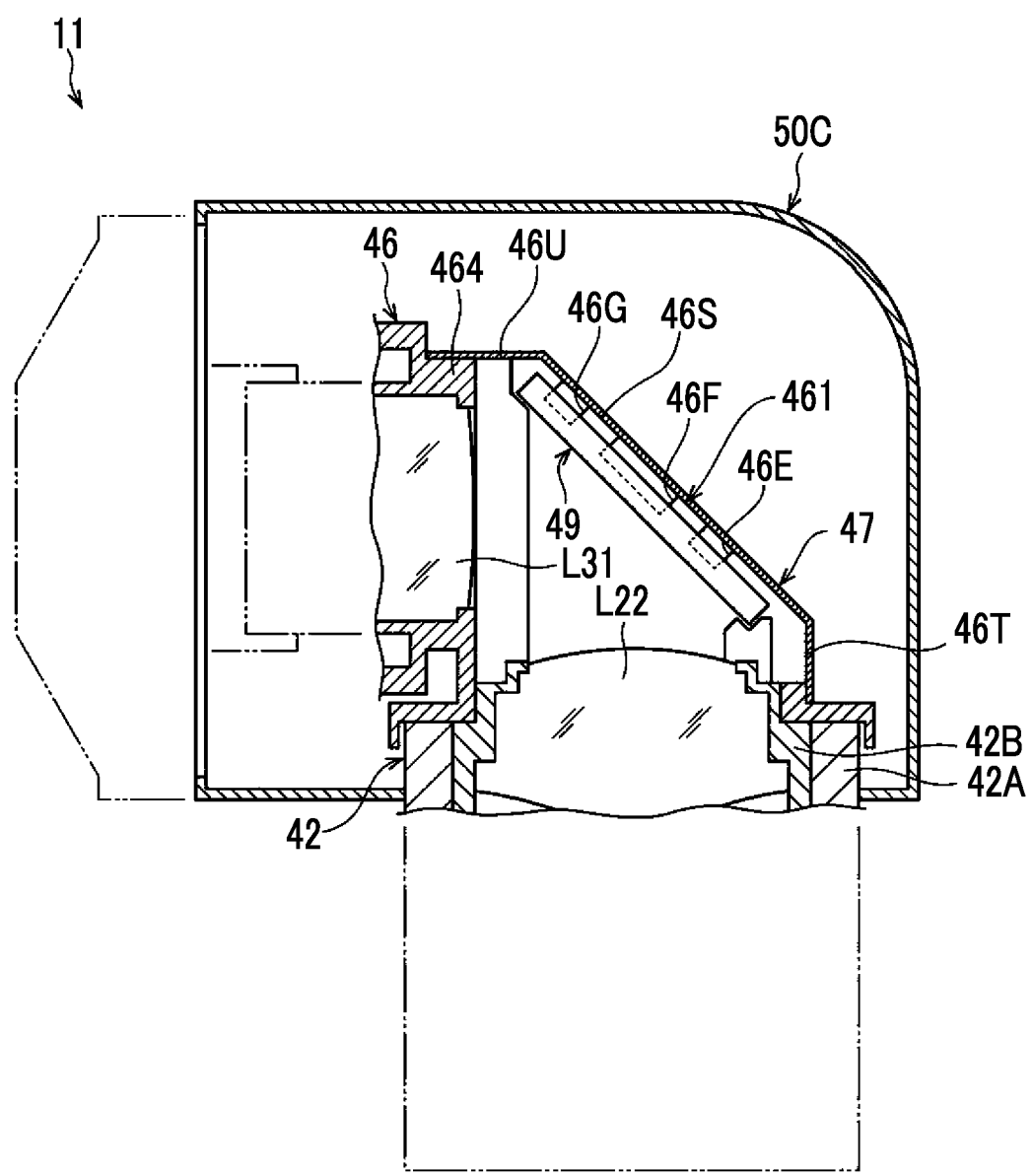
FIG. 11 is a longitudinal sectional view of the second mirror, the second mirror holding part, and a third exterior cover.
Figure 12:
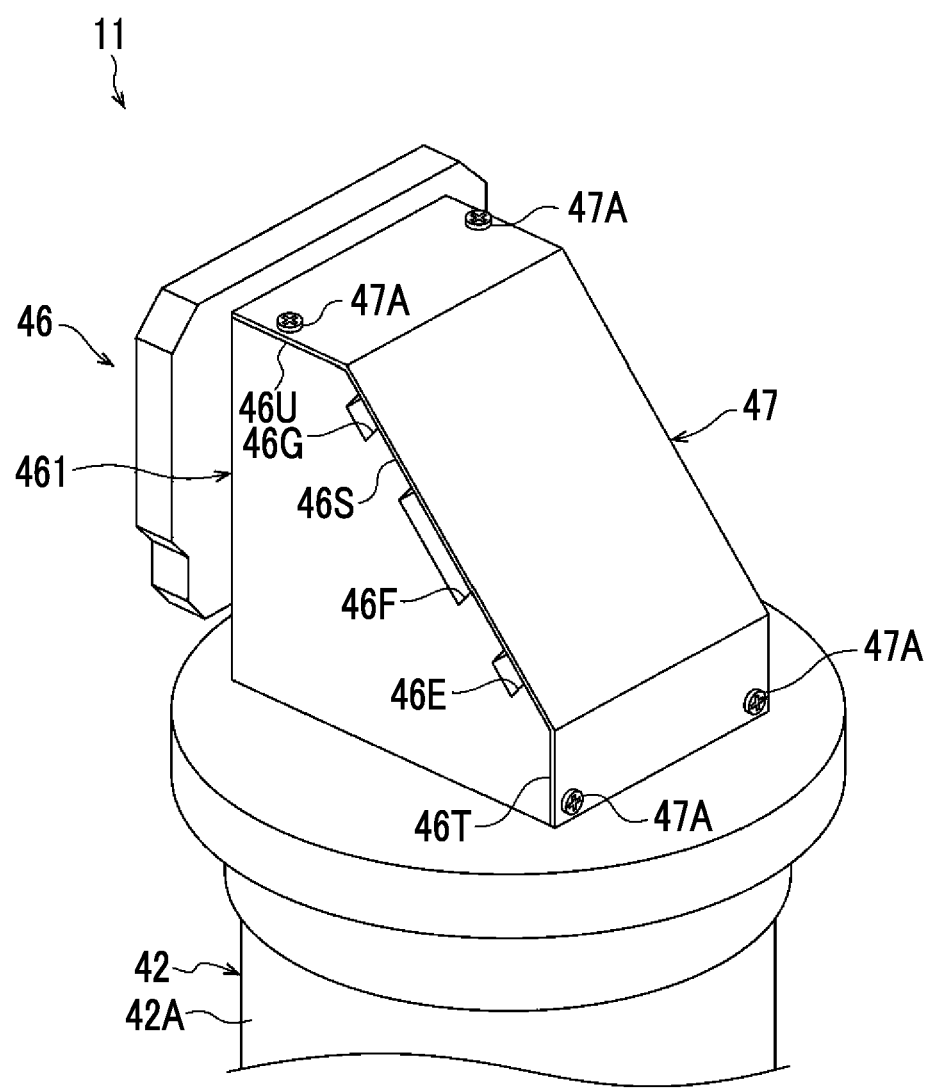
FIG. 12 is a perspective view of the second mirror, the second mirror holding part, and a second holding unit cover.

As shown in FIGS. 11 and 7, the second holding unit cover 47 is formed in the shape of a plate that is bent along the oblique sides 46S, the first sides 46T, and the second sides 46U of the first and second side walls 461 and 462 in a side view. As shown in FIGS. 7 and 12, the second holding unit cover 47 is fixed to the first and second sides 46T and 46U of the first side wall 461 and the first and second sides 46T and 46U of the second side wall 462 by fastening members 47A, such as screws.

As shown in FIGS. 11 and 12, the second holding unit cover 47 covers the opening portion 468. In detail, the second holding unit cover 47 covers the first and second insertion holes 467 and 469 and the back 49R of the second mirror 49.

As shown in FIG. 12, the second holding unit cover 47 does not cover the openings of the recessed portions 46E, 46F, and 46G of the first side wall 461 opposite to the first side surface 49A. Further, the second holding unit cover 47 does not cover the openings of the recessed portions 46E, 46F, and 46G of the second side wall 462 opposite to the second side surface 49B.

As shown in FIG. 11, the third exterior cover 50C covers the entirety of the first side wall 461, the second side wall 462, and the second holding unit cover 47. In other words, the third exterior cover 50C covers the above-mentioned openings of the recessed portions 46E, 46F, and 46G that are not covered with the second holding unit cover 47.

Figure 13:
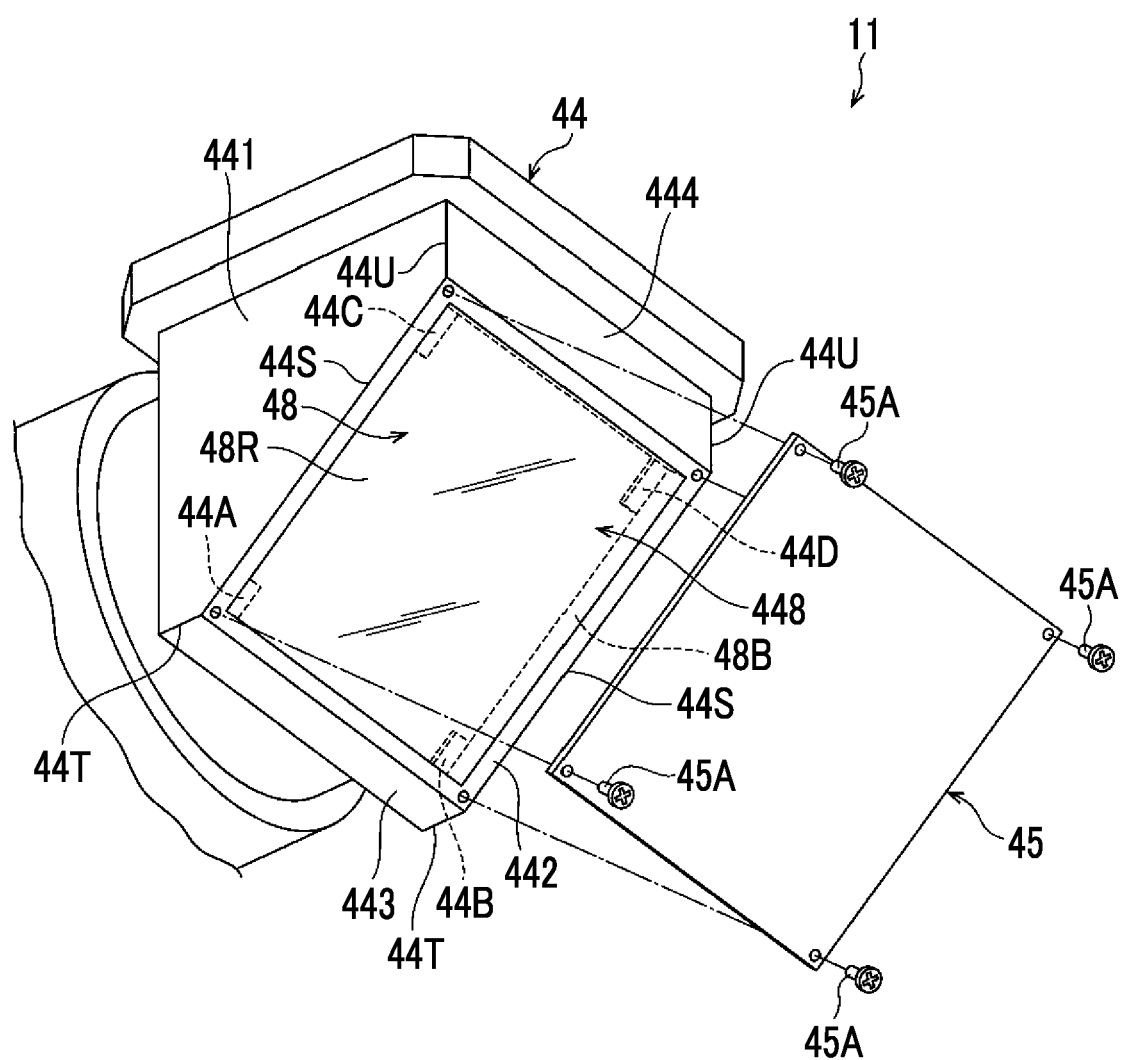
FIG. 13 is a perspective view of a first mirror and a first mirror holding part.
Figure 14:
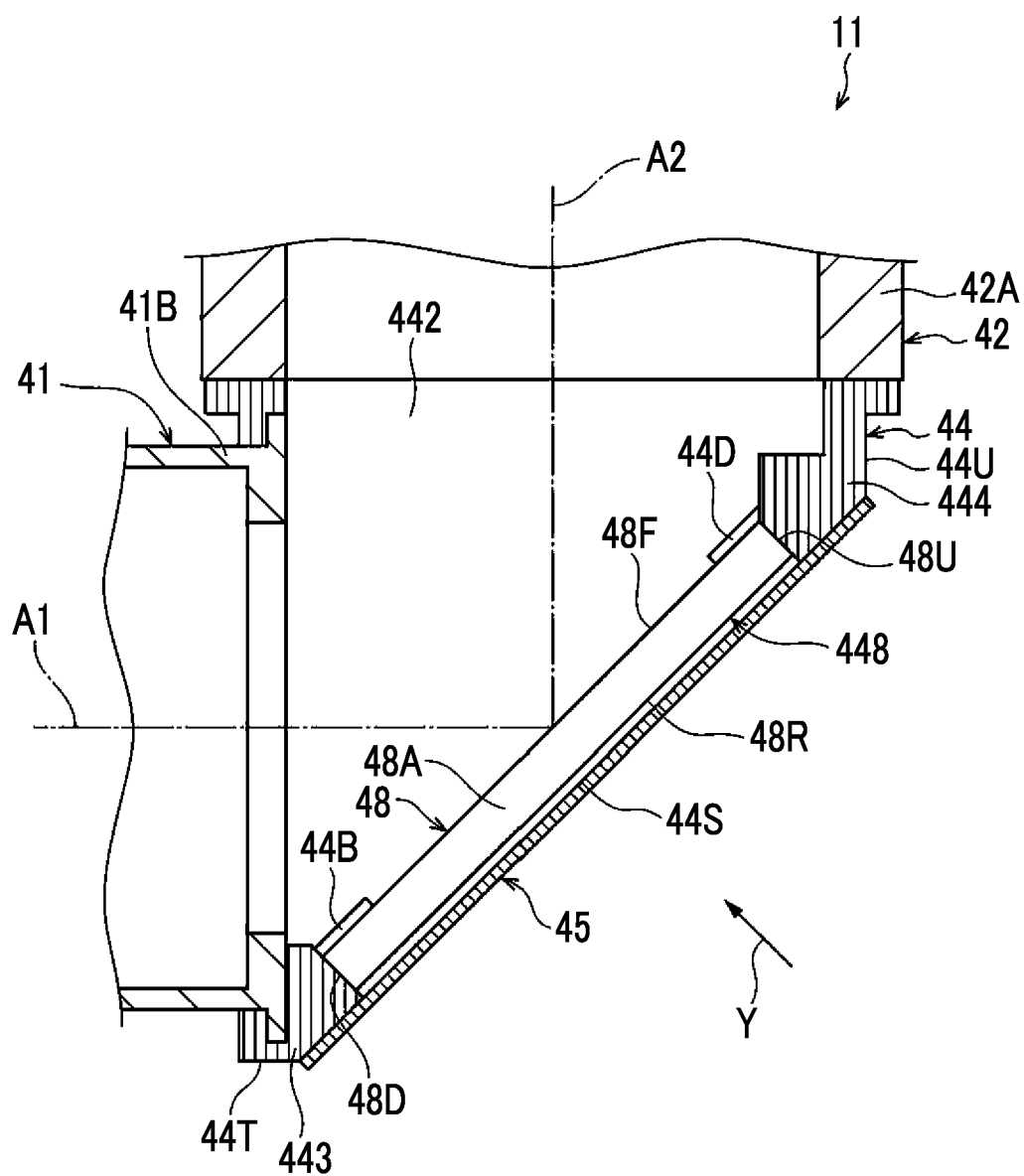
FIG. 14 is a longitudinal sectional view of the first mirror and the first mirror holding part.
Figure 15:
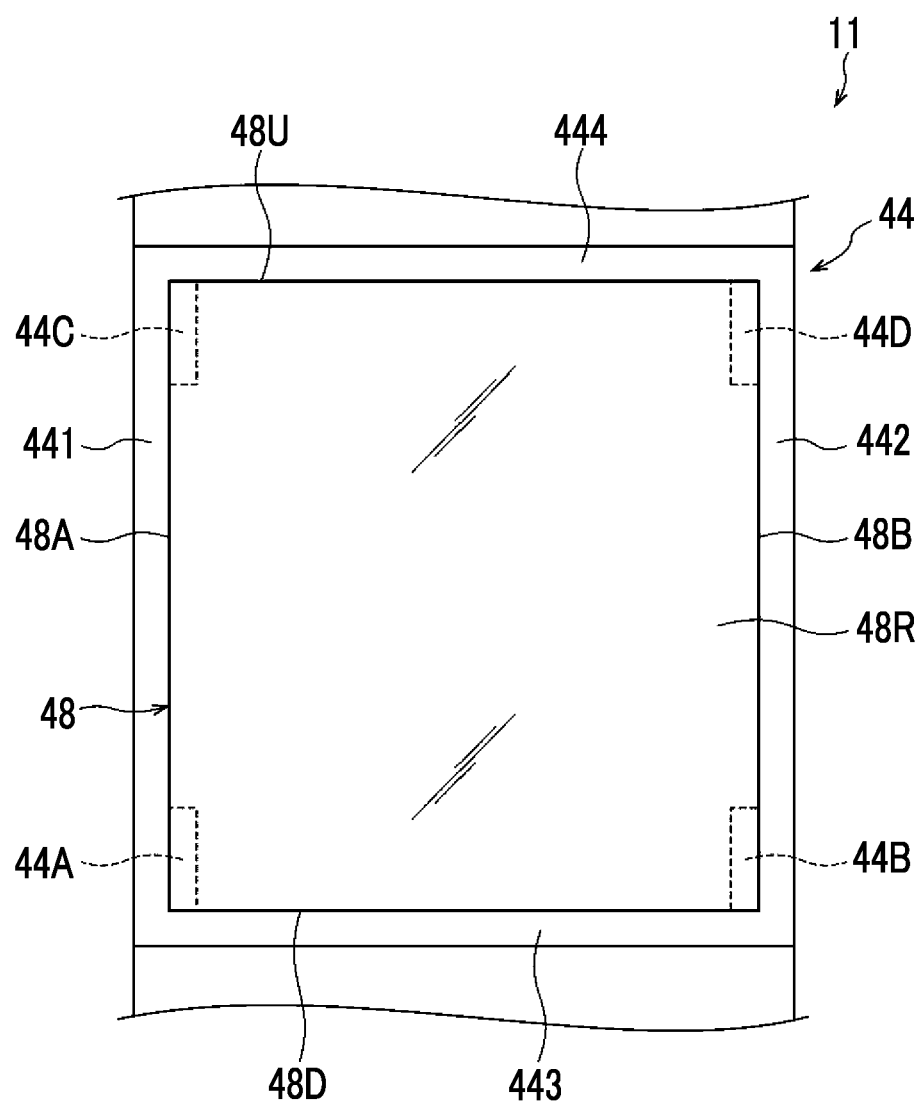
FIG. 15 is a diagram showing the first mirror and the first mirror holding part that are viewed from the back side of the first mirror in a thickness direction of the first mirror (the direction of an arrow Y of FIG. 14).

As shown in FIGS. 13, 14, and 15, the first mirror 48 has the shape of a rectangular plate. Specifically, the first mirror 48 includes a surface 48F, a back 48R, a first side surface 48A (see FIG. 14), a second side surface 48B, a first end face 48D, and a second end face 48U.

As shown in FIG. 14, the surface 48F is a reflective surface that reflects light parallel to the first optical axis A1. The back 48R is a surface opposite to the surface 48F. The surface 48F and the back 48R face each other. Specifically, the surface 48F and the back 48R are disposed substantially parallel to each other.

The first side surface 48A is a left side surface in FIG. 15. The second side surface 48B is a right side surface in FIG. 15. The first side surface 48A and the second side surface 48B face each other. More specifically, the first side surface 48A and the second side surface 48B are disposed substantially parallel to each other. The first side surface 48A and the second side surface 48B are examples of side surfaces of the second reflective part.

The first end face 48D is a lower surface in FIG. 15. The second end face 48U is an upper surface in FIG. 15. The first end face 48D and the second end face 48U face each other. More specifically, the first end face 48D and the second end face 48U are surfaces substantially parallel to each other.

The first end face 48D and the second end face 48U may be grasped as examples of side surfaces of the second reflective part.

As shown in FIG. 13, the first mirror holding part 44 includes a first side wall 441, a second side wall 442, a first connection wall 443, a second connection wall 444, and an opening portion 448.

Each of the first and second side walls 441 and 442 is formed in a substantially pentagonal shape including an oblique side 44S, a first side 44T, and a second side 44U in a side view (see FIG. 13). The oblique side 44S is a side along the back 48R of the first mirror 48 in a side view as shown in FIG. 14. Specifically, the oblique side 44S forms an angle of about 45° with respect to each of the first optical axis A1 and the second optical axis A2.

The first side 44T is a side that extends from one end (a lower end in FIG. 14) of the oblique side 44S along the first optical axis A1 in a direction (a left direction in FIG. 14) opposite to the traveling direction of light. The second side 44U is a side that extends from the other end (an upper end in FIG. 14) of the oblique side 44S along the second optical axis A2 in the traveling direction of light (an upward direction in FIG. 14).

As shown in FIG. 13, the first connection wall 443 connects the first side 44T (a lower portion in FIG. 13) of the first side wall 441 to the first side 44T (a lower portion in FIG. 13) of the second side wall 442. The second connection wall 444 connects the second side 44U (a right end portion in FIG. 13) of the first side wall 441 to the second side 44U (a right end portion in FIG. 13) of the second side wall 442.

The opening portion 448 is formed between the oblique side 44S of the first side wall 441 and the oblique side 44S of the second side wall 442. Specifically, the opening portion 448 is surrounded by the first side wall 441, the second side wall 442, the first connection wall 443, and the second connection wall 444 and is formed in the same rectangular shape as the first mirror 48.

Further, there is no gap between each of the first side surface 48A, the second side surface 48B, the first end face 48D, and the second end face 48U of the first mirror 48 and the first mirror holding part 44; or a gap is smaller than the gap 49G of the second mirror 49 even if there is a gap therebetween.

Furthermore, the first side wall 441 covers the first side surface 48A of the first mirror 48. That is, the first side wall 441 does not include holes facing the first side surface 48A of the first mirror 48. In addition, the second side wall 442 covers the second side surface 48B of the first mirror 48. That is, the second side wall 442 does not include holes facing the second side surface 48B of the first mirror 48.

As shown in FIGS. 13, 14, and 15, contact portions 44A, 44B, 44C, and 44D disposed at four corners of the opening portion 448 are formed at the first mirror holding part 44. A part of the surface 48F of the first mirror 48 is fixed to the first mirror holding part 44 by an adhesive in a state where a part of the surface 48F of the first mirror 48 is in contact with the contact portions 44A, 44B, 44C, and 44D. The same adhesive as the above-mentioned adhesive 93 is used as the adhesive.

Figure 16:
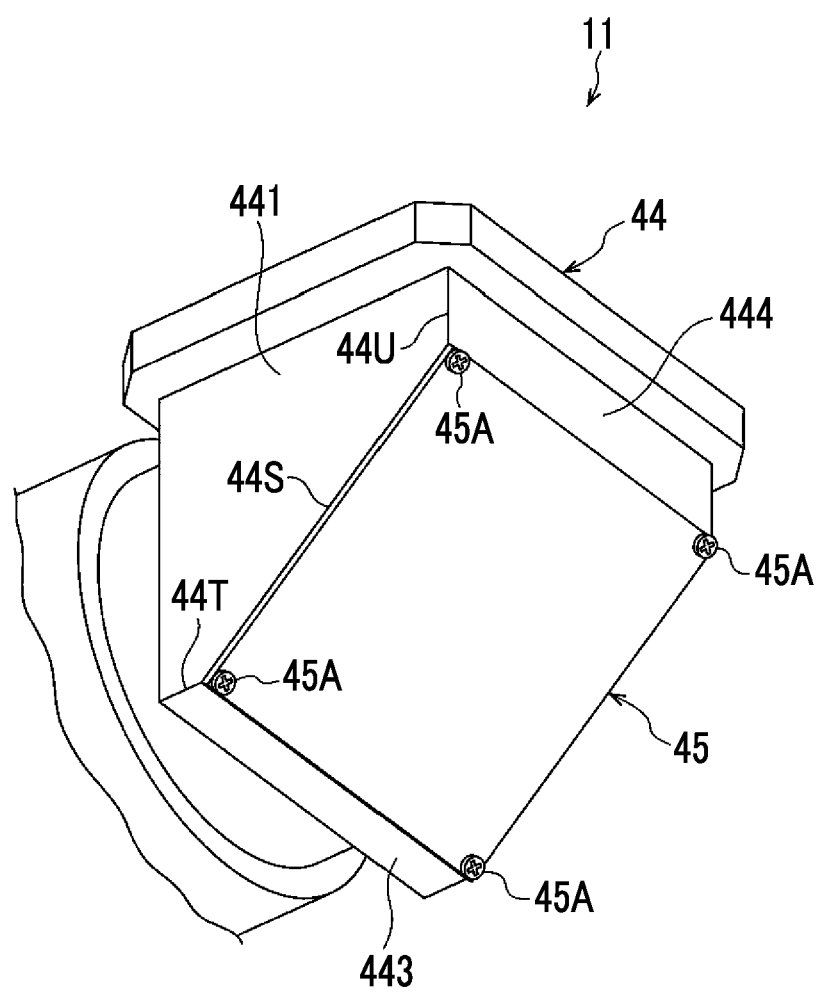
FIG. 16 is a perspective view of the first mirror, the first mirror holding part, and a first holding unit cover.

As shown in FIGS. 13 and 14, the first holding unit cover 45 is formed in the shape of a plate along the oblique sides 44S of the first and second side walls 441 and 442 in a side view. The first holding unit cover 45 is fixed to the oblique side 44S of the first side wall 441 and the oblique side 44S of the second side wall 442 by fastening members 45A, such as screws. As shown in FIGS. 13 and 16, the first holding unit cover 45 covers the opening portion 448 to close the opening portion 448.

Next, the effects of this embodiment will be described.

As shown in FIG. 10, the projection lens 11 includes the first and second insertion holes 467 and 469. For this reason, the pair of support parts 102 can support the second mirror 49 in a state where the pair of support parts 102 of the holding device 100 is inserted into the first and second insertion holes 467 and 469, respectively. Further, in a state where the pair of support parts 102 supports the second mirror 49, the attitude of the second mirror 49 can be adjusted. Accordingly, in the projection lens 11, the second mirror 49 can be fixed by the adhesive 93 (see FIG. 9) after the attitude of the second mirror 49 is adjusted. Since the attitude of the second mirror 49 is adjusted as described above, the third optical axis A3 can be precisely adjusted.

In particular, since the inner barrel 42B of the second lens barrel unit 42 is rotatable about the second optical axis A2 with respect to the outer barrel 42A of the second lens barrel unit 42 in the projection lens 11, the third optical axis A3 should be appropriately adjusted in the respective directions (a vertical direction, a horizontal direction, and a depth direction in FIG. 8). For this reason, a pair of side surfaces of the second mirror 49 is disposed so as to have a gap between themselves and the second mirror holding part 46. Since the second mirror 49 is moved two-dimensionally or three-dimensionally using this gap, configuration in which the third optical axis A3 can be precisely adjusted is effective.

Further, in this embodiment, as shown in FIG. 9, the first and second side surfaces 49A and 49B of the second mirror 49 adhere to the first and second side walls 461 and 462 of the second mirror holding part 46 through the adhesive 93. Furthermore, the back 49R of the second mirror 49 does not adhere to the second mirror holding part 46. Moreover, the back 49R is not in contact with the second mirror holding part 46 for the adjustment of the attitude of the second mirror 49. On the other hand, since the first mirror 48 is a member serving as a reference for the adjustment of the second mirror 49, a part of the surface 48F is in contact with the respective contact portions 44A, 44B, 44C, and 44D of the first mirror holding part 44.

Since the first and second side surfaces 49A and 49B of the second mirror 49 are fixed to the second mirror holding part 46 as described above, the attitude of the second mirror 49 is easily adjusted and the third optical axis A3 can be precisely adjusted in comparison with a case where the back 49R of the second mirror 49 is fixed to the second mirror holding part 46.

Further, since the adhesive 93 used to cause the second mirror 49 to adhere is an active energy ray-curable resin, in the projection lens 11, the adhesive 93 is quickly cured by irradiated with energy rays, such as ultraviolet rays. For this reason, the second mirror 49 is easily fixed to the second mirror holding part 46 while the attitude of the second mirror 49 of which the attitude has been adjusted is maintained.

Furthermore, in the projection lens 11, as shown in FIGS. 7 and 12, the second holding unit cover 47 covers the first and second insertion holes 467 and 469 and the back 49R of the second mirror 49. Accordingly, the second mirror 49 is protected.

In addition, in the projection lens 11, as shown in FIG. 11, the third exterior cover 50C covers the openings of the recessed portions 46E, 46F, and 46G that are not covered with the second holding unit cover 47. Accordingly, the second mirror 49 is protected from external factors, such as contact with a user.

Further, in the projection lens 11, the first and second side walls 441 and 442 of the first mirror holding part 44 do not include holes facing the first and second side surfaces 48A and 48B of the first mirror 48 (see FIG. 13). For this reason, since holes do not need to be machined, the shape of the first mirror holding part 44 can be simplified.

In this embodiment, the second mirror 49 is fixed to the second mirror holding part 46 in a state where the second mirror 49 is not in contact with the second mirror holding part 46. However, the invention is not limited thereto. For example, the corners of the second mirror 49 may be in contact with the second mirror holding part 46. Further, it is preferable that each side surface of the second mirror 49 and the middle portion of each end face thereof are not in contact with the second mirror holding part 46. Furthermore, the second mirror 49 may be fixed at positions where a part of the second mirror 49 is in contact with the second mirror holding part 46 as a result of the adjustment of the attitude of the second mirror 49.

Further, the projection lens 11 has three optical axes, that is, the first optical axis A1, the second optical axis A2, and the third optical axis A3 in this embodiment, but the invention is not limited thereto. For example, the projection lens 11 may be adapted to have two optical axes, that is, the second optical axis A2 and the third optical axis A3 of this embodiment.

Furthermore, the outer barrel 41B of the first lens barrel unit 41 is rotatable about the first optical axis A1 with respect to the inner barrel 41A in this embodiment, but the outer barrel 41B may be adapted not to be rotatable with respect to the inner barrel 41A.

Moreover, the inner barrel 42B of the second lens barrel unit 42 is rotatable about the second optical axis A2 with respect to the outer barrel 42A in this embodiment, but the inner barrel 42B may be adapted not to be rotatable with respect to the outer barrel 42A.

Next, the configuration of a part of the projection lens 11 will be specifically described from a second point of view.

As described above, the projection lens 11 comprises the incident-side end part 14A (see FIG. 5). In addition, as described above, the projection lens 11 comprises the second lens barrel unit 42 that comprises the outer barrel 42A and the inner barrel 42B, the second mirror 49, the second mirror holding part 46, the third lens barrel unit 43, the second optical system L2, and the third optical system L3 (see FIG. 6).

The second mirror 49 is an example of a reflective part. The inner barrel 42B of the second lens barrel unit 42 is an example of a first holding frame. The second mirror holding part 46 is an example of a second holding frame. The third lens barrel unit 43 is an example of a fourth holding frame. The outer barrel 42A of the second lens barrel unit 42 is an example of a fifth holding frame. The second optical system L2 is an example of an intermediate optical system. The third optical system L3 is an example of an emission optical system.

Further, in the projection lens 11, not only the position of the above-mentioned second mirror 49 can be adjusted but also the third lens barrel unit 43 is movable in a plane crossing the traveling direction of light parallel to the third optical axis A3. In other words, the third lens barrel unit 43 is movable in the vertical direction and the depth direction in FIG. 6. Accordingly, the third optical axis A3 can be adjusted. After the third optical axis A3 is adjusted, the stationary barrel 43A of the third lens barrel unit 43 is fixed to the second mirror holding part 46 by fastening members, such as screws. The adjustment of the third optical axis A3 using the movement of the third lens barrel unit 43 is performed, for example, before the projector 10 is shipped as a product.

As described above, in this embodiment, the third optical axis A3 can be adjusted by the second mirror 49 for reflecting the light parallel to the second optical axis A2 and the movement of the third lens barrel unit 43. Since the projection lens 11 includes mechanisms for adjusting an optical axis before the optical axis is reflected and after the optical axis is reflected as described above, the sagittal plane and the tangential plane of the optical axis can be adjusted. As a result, the third optical axis A3 can be precisely adjusted.

In this embodiment, the attitude of the second mirror 49 can be adjusted using the first and second insertion holes 467 and 469. However, instead of this, the inner barrel 42B of the second lens barrel unit 42 may be movable in a plane crossing the traveling direction of light parallel to the second optical axis A2. Accordingly, the second optical axis A2 can be adjusted.

Figure 17:
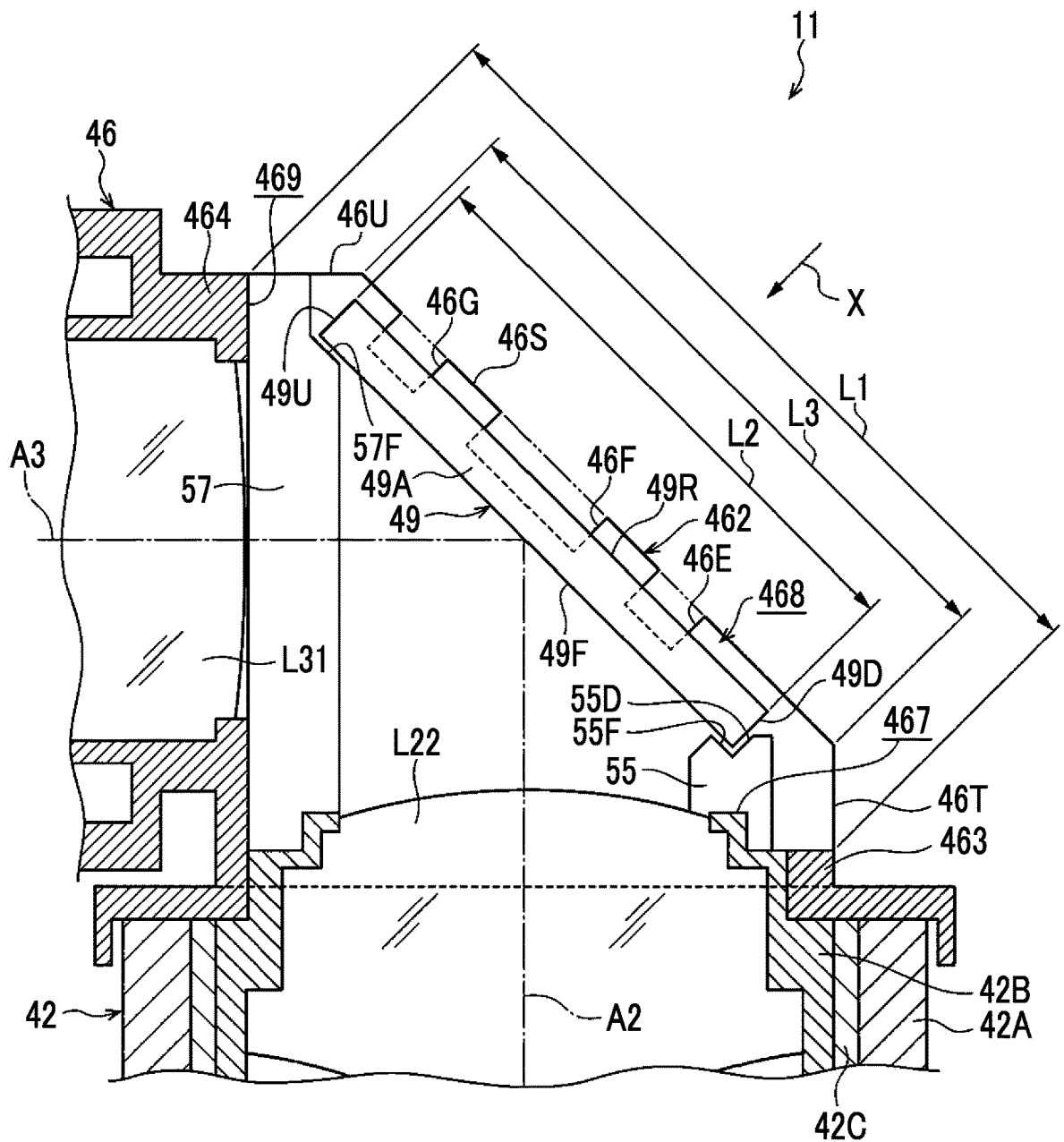
FIG. 17 is a longitudinal sectional view of an outer barrel, an intermediate barrel, and an inner barrel of a second lens barrel unit.

Specifically, in FIG. 17, the second lens barrel unit 42 includes an outer barrel 42A, an intermediate barrel 42C, and an inner barrel 42B. Further, the third holding unit 15C including the intermediate barrel 42C and the inner barrel 42B is rotated with respect to the second holding unit 15B including the outer barrel 42A. The inner barrel 42B is fixed to the intermediate barrel 42C by fastening members, such as screws, in a state where the projection lens 11 is in use. However, in a case where the fixing forces of the fastening members are reduced, the inner barrel 42B is movable in the outer barrel 42A and the intermediate barrel 42C in a plane crossing the traveling direction of light parallel to the second optical axis A2. Accordingly, the second optical axis A2 can be adjusted. After the second optical axis A2 is adjusted, the inner barrel 42B is fixed to the intermediate barrel 42C by fastening members. The adjustment of the second optical axis A2 using the movement of the inner barrel 42B is performed, for example, before the projector 10 is shipped as a product.

Further, as described above, the projection lens 11 according to this embodiment is adapted so that the third lens barrel unit 43 is movable in a plane crossing the traveling direction of light parallel to the third optical axis A3. Accordingly, before the optical axis is reflected and after the optical axis is reflected, the optical axis can be adjusted by the in-plane movement of the inner barrel 42B of the second lens barrel unit 42 and the in-plane movement of the third lens barrel unit 43. Therefore, both the sagittal plane and the tangential plane of the optical axis can be adjusted. That is, there are two means for adjusting the second optical axis A2 that is not yet changed into the third optical axis without being reflected. One is means for allowing the second mirror holding part 46 to include pairs of hole portions (recessed portions 46E, 46F, and 46G) provided at positions corresponding to the pair of side surfaces of the second mirror 49 and adjusting the position of the second mirror 49 through the hole portions. The other is means for allowing the inner barrel 42B, which forms the second lens barrel unit 42 and includes a lens group, to be movable in a plane crossing the traveling direction of light parallel to the second optical axis A2.

A transmission type image forming panel, which uses an LCD instead of a DMD, may be used as the image forming panel 32 corresponding to an electro-optical element. Alternatively, a panel using a self-luminous element, such as a light emitting diode (LED) and/or an organic electroluminescence (EL) display, instead of a DMD may be used. A total reflection type mirror may be used as the reflective part instead of a specular reflection mirror.

An example where a laser light source is used as the light source 34 has been described in the example, but the invention is not limited thereto. A mercury lamp and/or an LED may be used as the light source 34. Further, the blue laser light source and the yellow phosphor have been used in the example, but the invention is not limited thereto. A green phosphor and a red phosphor may be used instead of the yellow phosphor. Furthermore, a green laser light source and a red laser light source may be used instead of the yellow phosphor.

In this specification, "A and/or B" is synonymous with "at least one of A or B". That is, "A and/or B" may mean only A, may mean only B, or may mean a combination of A and B. Further, in this specification, the same meaning as "A and/or B" is applied even in a case where three or more items are expressed so as to be connected using "and/or".

All documents, patent applications, and technical standards disclosed in this specification are incorporated in this specification by reference so that the incorporation of each of the documents, the patent applications, and the technical standards by reference is specific and is as detailed as that in a case where the documents, the patent applications, and the technical standards are described individually.

Further, a projection lens according to Additional claim to be described below can be grasped from the above description.

[Additional Claim 1]
A projection lens that is mounted on a housing of a projection device including an electro-optical element and includes a plurality of lenses, the projection lens comprising:
a first holding frame through which light emitted from the housing passes;
a first reflective part that reflects an optical axis of light emitted from the first holding frame and includes a pair of side surfaces facing each other;
a second holding frame that holds the first reflective part through an adhesive; and
a first cover part,
wherein a pair of first holes provided at positions corresponding to the pair of side surfaces is provided between the first reflective part and the second holding frame,
the first reflective part includes a surface reflecting light and a back,
the surface and the pair of side surfaces face the second holding frame, and
the back faces the first cover part.

What is claimed is:

1. A projection lens that is mounted on a housing of a projection device including an electro-optical element, the projection lens comprising:
a first holding frame through which light emitted from the housing passes;
a first reflective part that reflects an optical axis of light emitted from the first holding frame and includes a pair of side surfaces facing each other;
a second holding frame that holds the first reflective part and includes a pair of gaps provided at positions corresponding to the pair of side surfaces; and
a first cover,
wherein the first reflective part is adhered to the second holding frame,
wherein a pair of gaps is formed between each side surface and the second holding frame, and
wherein the first cover member that covers the pair of gaps and the first reflective part.

2. The projection lens according to claim 1,
wherein the second holding frame is rotatable with respect to the first holding frame.

3. The projection lens according to claim 1,
wherein the first reflective part includes a surface reflecting light emitted from the first holding frame and a back, and
the back of the first reflective part does not adhere to the second holding frame.

4. The projection lens according to claim 1,
wherein the second holding frame includes second holes facing the side surfaces of the first reflective part, and
the side surfaces of the first reflective part adhere to the second holding frame through an adhesive.

5. The projection lens according to claim 4,
wherein the adhesive is an active energy ray-curable resin.

6. The projection lens according to claim 4, further comprising:
a second cover member that covers the second holes.

7. The projection lens according to claim 1, further comprising:
a second reflective part that reflects light, which is emitted from the housing and is parallel to a first optical axis, to form light parallel to a second optical axis; and
a third holding frame that holds the second reflective part and includes no hole at positions facing side surfaces of the second reflective part,
wherein the first reflective part reflects the light, which is parallel to the second optical axis, to form light parallel to a third optical axis.

8. The projection lens according to claim 1,
wherein a gap is provided between each of all the side surfaces of the first reflective part and the second holding frame.

9. The projection lens according to claim 2, further comprising:
a first cover member that covers the pair of first holes.

10. The projection lens according to claim 2,
wherein the first reflective part includes a surface reflecting light emitted from the first holding frame and a back, and
the back of the first reflective part does not adhere to the second holding frame.

11. The projection lens according to claim 1,
wherein the first reflective part includes a surface reflecting light emitted from the first holding frame and a back, and
the back of the first reflective part does not adhere to the second holding frame.

12. The projection lens according to claim 2,
wherein the second holding frame includes second holes facing the side surfaces of the first reflective part, and
the side surfaces of the first reflective part adhere to the second holding frame through an adhesive.

13. The projection lens according to claim 1,
wherein the second holding frame includes second holes facing the side surfaces of the first reflective part, and
the side surfaces of the first reflective part adhere to the second holding frame through an adhesive.

14. The projection lens according to claim 3,
wherein the second holding frame includes second holes facing the side surfaces of the first reflective part, and the side surfaces of the first reflective part adhere to the second holding frame through an adhesive.

15. The projection lens according to claim 2, further comprising:
a second reflective part that reflects light, which is emitted from the housing and is parallel to a first optical axis, to form light parallel to a second optical axis; and
a third holding frame that holds the second reflective part and includes no hole at positions facing side surfaces of the second reflective part,
wherein the first reflective part reflects the light, which is parallel to the second optical axis, to form light parallel to a third optical axis.

16. A projection lens that is mounted on a housing of a projection device including an electro-optical element, the projection lens comprising:
a first holding frame through which light emitted from the housing and parallel to a second optical axis passes and which holds an intermediate optical system;
a reflective part that includes a pair of side surfaces facing each other and reflects the light parallel to the second optical axis to form light parallel to a third optical axis;
a second holding frame that holds the reflective part; and
a fourth holding frame that holds an emission optical system emitting the light parallel to the third optical axis,
wherein the fourth holding frame is movable in a plane crossing a traveling direction of the light parallel to the third optical axis,
(A) or (B) is satisfied,
(A) the second holding frame includes a pair of first holes provided at positions corresponding to the pair of side surfaces of the reflective part, and
(B) the first holding frame is movable in a plane crossing a traveling direction of the light parallel to the second optical axis.

17. The projection lens according to claim 16, further comprising:
a fifth holding frame through which the second optical axis passes,
wherein the first holding frame is present in the fifth holding frame, and
the first holding frame is movable in the fifth holding frame in a plane crossing the traveling direction of the light parallel to the second optical axis.

18. The projection lens according to claim 17, further comprising:
a second holding unit that includes the fifth holding frame,
wherein the first holding frame, the second holding frame, and the fourth holding frame are connected to each other to form a third holding unit, and
the third holding unit is rotatable with respect to the second holding unit.

19. The projection lens according to claim 18, further comprising:
a first holding unit through which light parallel to a first optical axis, which forms light parallel to the second optical axis by being reflected, passes,
wherein the second holding unit is rotatable with respect to the first holding unit.

* * * * *